United States Patent [19]
Kajita et al.

[11] Patent Number: 5,432,658
[45] Date of Patent: Jul. 11, 1995

[54] ROTARY-MAGNETIC-HEAD DYNAMIC TRACK FOLLOWING DEVICE

[75] Inventors: Nobuyuki Kajita, Kashiwa; Takamasa Uejima, Abiko, both of Japan

[73] Assignee: Sharp Kabushiki Kaisha, Osaka, Japan

[21] Appl. No.: 6,261

[22] Filed: Jan. 19, 1993

[30] Foreign Application Priority Data

Jan. 22, 1992 [JP] Japan .................. 4-008822
May 25, 1992 [JP] Japan .................. 4-132632
Nov. 19, 1992 [JP] Japan .................. 4-310352

[51] Int. Cl.[6] ............... G11B 5/588; G11B 21/10
[52] U.S. Cl. ............... 360/77.16; 360/107; 360/109
[58] Field of Search .......... 360/109, 118, 77.13–77.17, 360/107

[56] References Cited

U.S. PATENT DOCUMENTS 4,327,384  4/1982  Tomita et al. ............... 360/109
5,223,992  6/1993  Mitsuhashi ................ 360/109

FOREIGN PATENT DOCUMENTS 59-213019  12/1984  Japan .
61-55173   11/1986  Japan .
62-243112  10/1987  Japan .
8809029    11/1988  WIPO .

OTHER PUBLICATIONS

Patent Abstracts of Japan vol. 9, No. 83 (P-384) 12 Apr. 1985.
Patent Abstracts of Japan, vol. 12, No. 114 (P-688) 12 Apr. 1985.

Primary Examiner—Robert S. Tupper

[57] ABSTRACT

In a rotary-magnetic-head dynamic track following device of the present invention, a coil for generating a controlling magnetic field that shifts a magnetic head along its rotation axis, a magnet for generating a constant magnetic field, a yoke section for allowing the constant magnetic field to form a closed loop (for example, an upper yoke and a lower yoke) are installed in a ring shape around the rotation axis. The lower drum also functions as a fixed drum. A head support member, which has spiral grooves formed along its outer edge section, is fixed to the bottom face of the outer circumferential wall of the upper drum. The upper drum and a rotary transformer core section are fixed to a rotary cylinder, and thus rotated together with a motor section and the head support member as one unit. This arrangement makes it possible to achieve compactness of the rotary-magnetic-head dynamic track following device as well as providing superior performances such as: a better response characteristic of the head displacement adjusting mechanism; reduction of slide resistance of the magnetic tape; and reduced power consumption.

14 Claims, 26 Drawing Sheets

F I G. 10
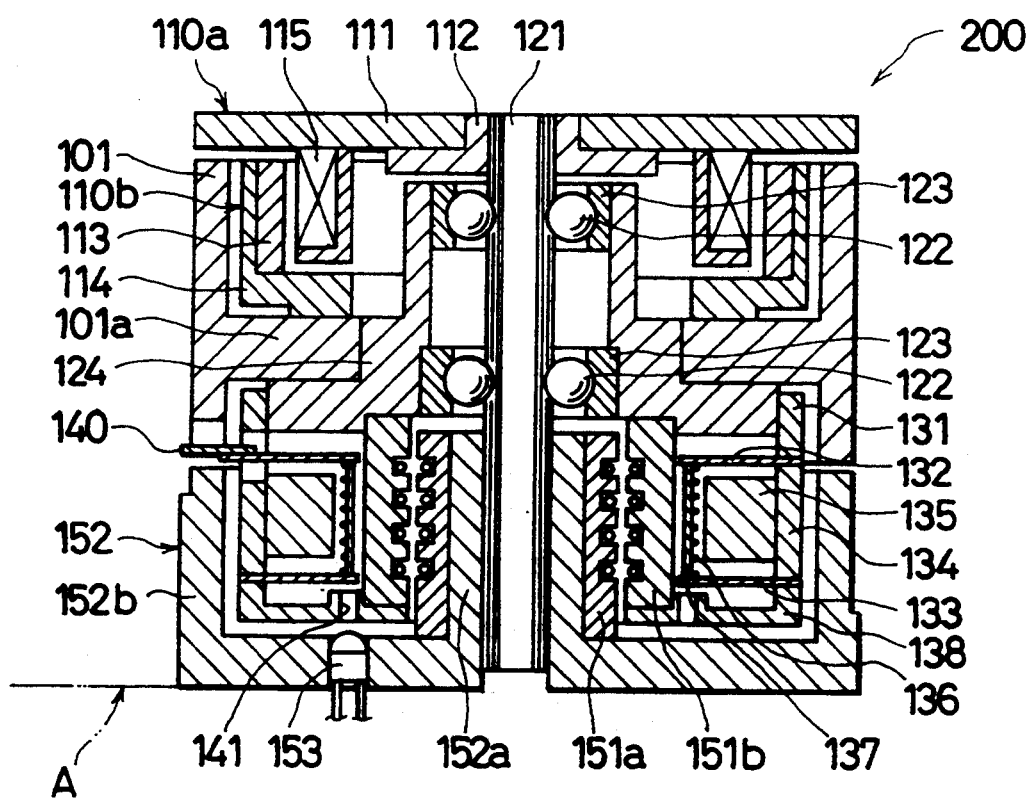

ROTARY-MAGNETIC-HEAD DYNAMIC TRACK FOLLOWING DEVICE

FIELD OF THE INVENTION

The present invention relates to a rotary-magnetic-head dynamic track following device which allows the magnetic head to follow track vacillation that is caused by, for example, mechanical vibration during reproduction of a magnetic tape. The rotary-magnetic-head dynamic track following device of the present invention is applied to a magnetic recording-reproduction apparatus that records and reproduces information on and from a magnetic tape by using a rotary magnetic head, and more particularly to a magnetic recording-reproduction apparatus wherein the effective contact angle of the magnetic tape with respect to a rotary drum is set to be smaller than the angle that is made by each pair of a plurality of magnetic heads installed in the rotary drum.

BACKGROUND OF THE INVENTION

In a magnetic recording-reproduction apparatus of the helical scanning method, which uses a rotary magnetic head, recorded tracks are formed during recording with a tilt at a predetermined angle to the direction of the motion of a magnetic tape. In particular, in a magnetic recording-reproduction apparatus that records and reproduces a digitized signal by using a plurality of magnetic heads, the effective contact angle of the magnetic tape with respect to a rotary drum is set to be smaller than the angle that is made by each adjacent pair of the magnetic heads. With this arrangement, it is possible to record the digitized signal discontinuously in time.

FIG. 22 illustrates an example of the installation of two magnetic heads, while FIG. 23 illustrates that of the installation of three magnetic heads. Here, in FIGS. 22 and 23, the rotation direction of a rotary drum 31 is indicated by an arrow X, and the direction of the movement of a magnetic tape 32 is indicated by an arrow Y.

In FIG. 22, angle D1 that is made by magnetic head 20a and magnetic head 20b is 180 degrees, and an effective contact angle D2 that is made by the magnetic tape 32 with the rotary drum 31 is set to be smaller than angle D1 by angle D3.

In FIG. 23, angle D1, which is made by each adjacent pair of magnetic heads among three magnetic heads 21a, 21b and 21c is 120 degrees, and as with the above case, an effective contact angle D2, which is made by the magnetic tape 32 with the rotary drum 31, is set to be smaller than angle D1 by angle D3.

Further, FIG. 24 illustrates an example of the multichannel system wherein two sets of magnetic heads, each set having a pair of magnetic heads, are installed in a rotary drum.

In FIG. 24, angle D1, which is made by one set of the magnetic heads 22a, 22b and another set of the magnetic heads 23a, 23b, is 180 degrees, and an effective contact angle D2, which is made by the magnetic tape 32 with the rotary drum 31, is set to be smaller than D1 by angle D3.

Here, the magnetic recording-reproduction apparatus, which uses a rotary magnetic head, generally has a problem of track vacillation. Track vacillation is a phenomenon where the center of an actually recorded track deviates off the center of the original straight track. The occurrence of track vacillation is caused by variation of tension applied to a magnetic tape in motion and adverse effects of mechanical vibration.

For this reason, it is necessary to provide a tracking control in order to allow the rotary magnetic head to follow track vacillation and to improve the quality of the reproduced signal. Moreover, in the case of varied speed reproduction such as slow motion reproduction and still reproduction, wherein the running speed of the magnetic tape is varied from that used during recording, a high-quality reproduced signal with less picture blurring and less guard-band noise can be obtained by allowing the rotary magnetic head to follow a recorded track accurately.

One method for providing such a tracking control as described above, which is known to the art, is a head moving mechanism wherein the rotary magnetic head is shifted in the width direction of a recording track according to a controlling signal. Here, simultaneously as a recording track is reproduced, a signal is obtained by detecting a relative position between the recording track and the rotary magnetic head, and this signal is used as the above-mentioned controlling signal. Further, in order to form recorded tracks having a constant pitch, the rotary magnetic head is kept at a predetermined level during recording.

FIGS. 25 and 26 show one example of the above-mentioned head moving mechanism.

FIG. 25 is a plan view of a rotary-magnetic-head dynamic track following device having the conventional head moving mechanism. FIG. 26 is a vertical sectional view taken along the line XI—XI of FIG. 25.

A rotary-magnetic-head dynamic track following device 40 is constituted of a head moving mechanism 50, a rotary drum 31, a fixed drum 33, a motor section 51, a bearing 52 integral with a shaft, and a rotary transformer 53.

A shaft-receiving hole 33a is formed in the center of the upper surface of the fixed drum 33. The shaft of the bearing 52 is inserted through the shaft-receiving hole 33a. The bearing 52 integral with the shaft is constituted of a shaft 52a, a pair of upper and lower outer rings 52b, a pair of upper and lower balls 52c, a collar 52d, and a pre-load spring 52e. The upper portion of the cylinder-like collar 52d is inserted into the shaft-receiving hole 33a so as to fit with the inner wall thereof.

The pair of upper and lower outer rings 52b are respectively fixed to the upper side and lower side of the collar 52d. The pre-load spring 52e is fitted between these outer rings 52b. Along the inner wall of each outer ring 52b are disposed a plurality of the balls 52c, which support the shaft 52a. The shaft 52a is capable of rotating smoothly about its center line as an axis of rotation.

The motor section 51 is installed at the lower side of the fixed drum 33. The motor section 51 is constituted of a motor stator 51a, a motor rotor 51b, and a collar 51c. The cylinder-like motor stator 51a is secured to the lower side of the fixed drum 33. The collar 51c is fixed to the lower side of the shaft 52a that is protruding from the lower surface of the fixed drum 33. The motor rotor 51b, which is coupled to the lower surface of the collar 51c, is aligned face to face with the motor stator 51a.

The cylinder-like rotary drum 31 is installed on the upper side of the fixed drum 33. The rotary drum 31 is fixed to the shaft 52a that is protruding from the upper surface of the fixed drum 33. The rotary drum 31 is provided with a plurality of cylindrical cavity sections having openings at the lower surface of the rotary drum 31. The cylindrical cavity sections (which are indicated by broken lines in FIG. 25) are formed symmetrically with respect to the axis of rotation of the rotary drum 31. Further, openings 31a are formed in the upper surface of the rotary drum 31. Each of the openings 31a provides a path through each cylindrical cavity section.

A part of the head moving mechanism 50 that is installed inside the cylindrical cavity section is exposed through the opening 31a. Further, a position sensor 34 is disposed above the opening 31a with a predetermined space in between. Then, a slip ring 35 is securely fixed to the upper surface of the rotary drum 31.

The rotary transformer 53 is constituted of a ring-shaped rotor transformer 53a and a stator transformer 53b. The stator transformer 53b is fixed to a ring-shaped groove formed on the upper surface of the fixed drum 33. The rotor transformer 53a is fixed to the bottom surface of the rotary drum 31. The rotor transformer 53a and the stator transformer 53b are aligned face to face with each other having a slight space in between.

A brush 36b, which is supported by a support member 36a, is arranged to contact the slip ring 35 of the rotary-magnetic-head dynamic track following device 40 that is arranged in a manner as described above. That is, the brush 36b and the slip ring 35 are electrically connected to each other.

Next, an explanation will be given on the arrangement of the head moving mechanism 50 by reference to FIG. 27, which shows an enlarged drawing of the head moving mechanism 50 in FIG. 26. In FIG. 27, the head moving mechanism 50 is constituted of a yoke section, a head movable section, and a permanent magnet.

The yoke section is constituted of an upper surface disc yoke 54a, a bottom surface disc yoke 54b, and a cylindrical yoke 54c. The cylindrical yoke 54c is inserted into the cylindrical cavity section formed in the rotary drum 31. The upper surface disc yoke 54a is fixed to the upper surface of the cylindrical yoke 54c and the bottom surface disc yoke 54b is fixed to the bottom surface of the cylindrical yoke 54c. A cut-out window is formed in the lower side of the cylindrical yoke 54c. Further, a hole is formed through the upper surface disc yoke 54a. The hole matches the opening 31a that is formed in the rotary drum 31.

Thus, the yoke section, which is empty inside, has a cylinder shape with the cut-out window in one portion thereof. Permanent magnets 55 and a head movable section are installed in the empty section inside the yoke section. The column-shaped permanent magnets 55 respectively secured to the upper surface disc yoke 54a and the bottom surface disc yoke 54b are aligned face to face with each other having a predetermined space in between. Here, since the yoke section is made of a material that allows magnetic fluxes to pass therethrough, a magnetic flux, which are caused by the head moving mechanism, form a closed loop in the yoke section.

The head movable section is constituted of an insulator 50a, a coil 50b, an upper support spring 50c, a lower support spring 50d, and a magnetic head 20.

Here, the upper support spring 50c and the lower support spring 50d are respectively fixed to the upper and the lower portions of the cylindrical yoke 54c. The upper support spring 50c and the lower support spring 50d are capable of moving in the directions indicated by arrows P in FIG. 27.

The magnetic head 20, which is secured to the lower support spring 50d, is exposed out of the rotary drum 31 along its outer circumferential face through the cut-out window formed in the cylindrical yoke 54c and the rotary drum 31. The cylindrical insulator 50d, whereon the coil 50b is wound, is secured to the upper support spring 50c in its upper end face, and to the lower support spring 50d in its lower end face. The two permanent magnets 55 facing each other are inserted into the insulator 50a.

A plurality of the head moving mechanisms 50, arranged as described above, are installed in the rotary drum 31. That is, in the cases of FIGS. 22 and 24, two head moving mechanisms 50 are installed in the rotary drum 31, while in the case of FIG. 23, three of them are installed therein.

Next, an explanation will be given on the operation of the conventional rotary-magnetic-head dynamic track following device provided with the above-mentioned head moving mechanism 50 by reference to FIGS. 26 and 27.

First, the motor section 51 is activated. In other words, the motor rotor 51b rotates with respect to the motor stator 51a. The torque of the motor rotor 51b is transmitted to the rotary drum 31 through the shaft 52a. Thus, the rotary drum 31 rotates. As the rotary drum 31 rotates, the opening 31a of the rotary drum 31 passes below the position sensor 34. During the passage of the opening 31a, the position of the upper support spring 50c along the upward or downward arrow P is detected by the position sensor 34.

According to the detection, a controlling current is supplied to the coil 50b through the brush 36b and the slip ring 35. In response to the current flowing in the wiring 50b and the magnetic flux exerted from the permanent magnets 55, the insulator 50a, whereon the coil 50b is wound, is subjected to a force exerted in the direction along either the upward or downward arrow P. Since the upper support spring 50c and the lower support spring 50d, both supporting the insulator 50a, are capable of moving in the direction along either the upward or downward arrow P, the insulator 50a is shifted in the direction toward which the force is exerted. When the insulator 50a is thus shifted, the magnetic head 20, which is securely fixed to the lower support spring 50d, is also shifted in the same arrow P direction. Thus, the magnetic head 20 is shifted to a desired position.

A reproduced signal from the magnetic head 20 is sent to a peripheral device through the rotor transformer 53a and the stator transformer 53b. Further, a recording signal is supplied to the magnetic head 20 from a peripheral device through the stator transformer 53b and the rotor transformer 53a.

As another example of such a head moving mechanism, the following description will discuss a rotary magnetic head apparatus that is disclosed in Japanese Examined Patent Publication 61-55173 (55173/1986) by reference to FIG. 28.

The magnetic head 4 is located in a space between the upper rotary drum 1 and the lower fixed drum 13. The rotary drum 1 and the magnetic head 4 are integrally rotated by a rotation supporting mechanism fixed to a rotation axis 15. The rotation supporting mechanism is constituted of a bottom support member 9, a center pole 12, a permanent magnet 8, a yoke 7, a spring fixing member 6, a plate spring member 5, a bobbin 10, and a magnetic head support plate 3, which are all located in this order from the rotation axis 15.

The magnetic head support plate 3 has a disc shape or a rod shape, and is fixed to the upper end of the small cylinder section of the bobbin 10. Ends of a plurality of the plate spring members 5 are respectively fixed to the side face of the small cylinder section and the spring fixing member 6, and the magnetic head 4 is thus supported at a predetermined level with respect to the bottom support member 9. A coil 11 is wound around the side face of the large cylinder section of the bobbin 10. Here, the bobbin 10 is made of an insulating member.

Here, the permanent magnet 8, the yoke 7, a cavity section 16 and the center pole 12 are arranged to form a magnetic circuit. The coil 11 is disposed in the cavity section 16; therefore, when the controlling signal is supplied to the coil 11, a driving force is generated by the interaction between the current and the magnetic field in such a manner that the bobbin 10 is shifted in the axis direction of the rotation axis 15. With this arrangement, the magnetic head 4 is shifted to a position at which the driving force balances the elastic force of the plate spring member 5.

In addition, the controlling signal is supplied to the coil 11 from a brush fixed outside (not shown) through the slip ring 14. Further, the rotary drum 1 is fixed to an axis portion that is secured to the center of the center pole 12 through the disc 2.

In the case where a magnetic recording-reproduction apparatus, which is provided with a rotary magnetic head, is used in a highly humid atmosphere or under an environmental condition having abrupt temperature changes, minute drops of water are formed between the magnetic tape and the lower drum, resulting in a thin water screen. The viscous resistance caused by the existence of this water screen tends to make the magnetic tape entirely adhere to the lower drum, or in the case of the intermittent adhesion, tends to cause a sort of self-excited vibration in the tape.

In order to achieve compactness and light weight of such a magnetic recording-reproduction apparatus as described above, the magnetic recording density of the magnetic tape needs to be improved. For this reason, metal tapes constituted of a resin base whereon a nickel-cobalt alloy is deposited or applied have come to be employed as those magnetic tapes. However, in this case, the metal tape and the lower drum, both of which are metals, are brought to contact and slide on each other. The result is that the relative friction coefficient becomes greater, thereby making it difficult to stabilize the travel of the magnetic tape.

In order to solve these problems, for example, such a magnetic recording-reproduction apparatus that is disclosed in Japanese Examined Patent Publication No. 60-19061 (Tokukoshou 19061/1985) is provided with spiral grooves 60 formed on the circumferential edge of the bottom surface of an upper drum 62, as is illustrated in FIGS. 29(a) and (b). Here, portions between the spiral grooves 60 are referred to as lands 61; these lands 61 are then aligned face to face with the upper surface of the lower drum with a minute gap in between. In this arrangement, since the upper drum 62 has a relative speed in the rotation direction indicated by an arrow R in FIG. 29(a) with respect to the lower drum, the spiral grooves 60 generate a dynamic pressure that is exerted from the rotation center O toward the periphery of the upper drum 62.

The dynamic pressure is increased or reduced depending on the width H of the circumferential edge of the bottom surface whereon the spiral grooves 60 are provided. More specifically, if the width H is increased by widening the difference between the distance from the rotation center O to the outer circumferential edge of the upper drum 62 and that from the rotation center O to the inner edge of the bottom surface, a greater dynamic pressure is generated. This dynamic pressure makes the magnetic tape slightly float from the circumferential face of the lower drum, thereby reducing the load imposed on the tape in travel.

Here, the following various problems are presented in the above-mentioned prior art devices.

For example, in the rotary-magnetic-head dynamic track following device 40, if the diameter and height of the rotary-magnetic-head dynamic track following device 40 are shortened in order to make the magnetic recording-reproduction apparatus compact and light, the diameter and height of the head moving mechanism 50 also need to be shortened in accordance with this modification. In this case, the amount of shift of the magnetic head 20 in relation to the current supplied to the coil 50b, the so-called current sensitivity, is reduced. This lowering of the current sensitivity is caused by a lowering of the magnetic property due to the miniaturization of the permanent magnet 55 and a rising of the magnetic resistance due to the shortage of the overlapping area between the inner wall of the cylinder yoke 54c and the circumferential face of the permanent magnet 55.

In order to compensate for this reduction, two methods are suggested: (i) a method for lowering the spring constants of the upper support spring 50c and the lower support spring 50d so as to obtain a predetermined amount of shift and (ii) a method for increasing the current to be supplied to the coil 50b.

However, in the case of the former compensation method, wherein the rigidities of the upper support spring 50c and the lower support spring 50d are lowered, the resonance frequency of the rotary-magnetic-head dynamic track following device 40 becomes lowered, and its response characteristic deteriorates. As a result, due to disturbances caused by varied tape tension that are imposed on the lower support spring 50d through the magnetic head 20, problems arise in which vacillation of the recorded tracks becomes larger with the result that the magnetic head cannot follow the recorded tracks during reproduction (runout in tracking).

In the case of the latter compensation method, the same problems as described above arise due to thermal distortion of the head moving mechanism 50, which is caused by the temperature increase that results from heat generation of the coil 50b; furthermore, a problem arise wherein power consumption of the rotary-magnetic-head dynamic track following device 40 increases. The above-mentioned problems become more serious when special provisions are made to make the magnetic recording-reproduction apparatus compacter and lighter with a view to enhancing the recording density by shortening the track pitch.

Moreover, in the conventional rotary magnetic head apparatus as disclosed in Japanese Examined Patent Publication No. 61-55173 (55173/ 1986), a motor section for rotating the rotation axis 15 and a rotation transformer section for transmitting a recording signal to the magnetic head 4 and a reproduced signal from the magnetic head 4 in a non-contact state need to be added thereto; this makes the entire rotary magnetic head apparatus bulky. As a result, it becomes difficult to provide a compact and light-weight magnetic recording-reproduction apparatus in which the rotary magnetic head apparatus is installed; therefore, it becomes difficult to achieve a technological development to provide high-density recording by the use of a compacter cassette tape in the compact and light-weight magnetic recording-reproduction apparatus.

Furthermore, in the arrangement wherein the spiral grooves 60, such as disclosed in Japanese Examined Patent Publication No. 60-19061 (Tokukoshou 19061/1985), are provided on the upper drum; if the thickness (width H) of the circumferential edge of the bottom surface of the upper drum is decreased in order to achieve compactness and light weight, it will be difficult to obtain a sufficient effect for reduction of the load imposed on the tape in travel. This is because, if the width H of the circumferential edge of the bottom surface is decreased, the dynamic pressure to be generated will also be reduced; thus, the amount of floatation of the magnetic tape with respect to the circumferential face of the lower drum is reduced.

If the thickness of the circumferential edge of the bottom surface is increased with the upper drum being kept compact in order to obtain a desired dynamic pressure, the head moving mechanism that is to be installed in the upper drum needs to be made compact. As a result, the same problems as described in the above rotary-magnetic-head dynamic track following device 40, such as lowering of the magnetic characteristic due to the shortage of the volume of the permanent magnet, increased power consumption of the rotary-magnetic-head dynamic track following device, deterioration of the response characteristic of the head moving mechanism, etc. are presented.

SUMMARY OF THE INVENTION

It is an object of the present invention to provide a rotary-magnetic-head dynamic track following device with superior sensitivity as well as achieving compactness and light weight and reduced power consumption thereof.

In addition to the above objective, another object of the present invention is to provide a rotary-magnetic-head dynamic track following device wherein slide resistance of a magnetic tape to a fixed drum is reduced.

It is still another object of the present invention to provide a rotary-magnetic-head dynamic track following device that is suitable for use in magnetic recording-reproduction apparatuses for high-density recording.

In order to achieve the above objectives, the rotary-magnetic-head dynamic track following device of the present invention allows the magnetic head to follow a recorded track in accordance with a detection signal indicating a relative position between the magnetic head and the recorded track formed on the magnetic tape by providing at least the following means.

(1) rotation means for generating a torque (for example, a motor section).

(2) magnetic field generating means for generating a first constant magnetic flux, the magnetic field generating means being disposed around a rotation shaft of the rotation means (for example, a permanent magnet).

(3) yoke means that is disposed in a ring shape around the magnetic field generating means in such a manner that the first magnetic flux forms a closed loop, the yoke means being provided with a slide face whereon the magnetic tape slides (for example, a ring-shaped yoke, a cylinder yoke, an upper yoke, or a lower yoke).

(4) magnetic-head displacement-adjusting means (for example, a head displacement-adjusting mechanism) that is constituted of a fixed section connected to the rotation means; a shiftable section for generating a second magnetic flux in accordance with a detection signal and for shifting itself along the rotation shaft through the interaction between the first magnetic flux and the second magnetic flux (for example, an insulator cylinder or a bobbin whereon a coil is provided); a head support section whereto the magnetic head is fixed (for example, a support spring or a head support member); and a connecting section that links the fixed section, the shiftable section and the head support section.

In the above arrangement, the magnetic field generating means is disposed around a rotation shaft of the rotation means and the yoke means is disposed in a ring shape around the magnetic field generating means; therefore, a sufficient space is provided for the installation of the magnetic field generating means as well as furnishing a sufficient overlapping area between the magnetic field generating means and the yoke means. Thus, without lowering the electric current sensitivity of the magnetic-head displacement-adjusting means, compactness and light weight of the rotary-magnetic-head dynamic track following device can be achieved.

Further, the yoke means is provided with the slide face whereon the magnetic tape slides; this arrangement permits the yoke means to also function as a so-called rotary drum or a fixed drum. In this case, the magnetic field generating means is installed in a ring shape inside the outer circumferential wall of the yoke means, and the magnetic-head displacement-adjusting means is disposed in the vicinity of the magnetic field generating means inside the yoke means.

This arrangement obviates the necessity of separately installing the yoke means and the rotary drum or the fixed drum, thereby making it possible to further achieve compactness and light weight of the rotary-magnetic-head dynamic track following device.

In order to achieve the above objectives, another rotary-magnetic-head dynamic track following device of the present invention is provided with at least the following means.

(1) rotation means for generating a torque (for example, a motor section).

(2) magnetic field generating means for generating a first constant magnetic flux, the magnetic field generating means being stationarily disposed around a rotation shaft of the rotation means (for example, a permanent magnet).

(3) yoke means that is stationarily disposed in a ring shape around the magnetic field generating means in such a manner that the first magnetic flux form a closed loop, (for example, a ring-shaped yoke, a cylinder yoke, an upper yoke, or a lower yoke).

(4) magnetic-head displacement-adjusting means (for example, a head displacement-adjusting mechanism) that is constituted of a fixed section connected to the rotation means; a shiftable section for generating a second magnetic flux in accordance with a detection signal and for shifting itself along the rotation shaft through the interaction between the first magnetic flux and the second magnetic flux (for example, an insulator cylinder or a bobbin whereon a coil is provided); a head support section whereto the magnetic head is fixed (for example, a support spring or a head support member); and a connecting section that links the fixed section, the shiftable section and the head support section.

Since the magnetic field generating means and the yoke means are stationarily installed, this arrangement obviates the necessity of rotating the magnetic field generating means and the yoke means by the use of the rotation means. As a result, in addition to the effect on compactness and light weight of the rotary-magnetic-head dynamic track following device, other effects are obtained: (i) loads imposed on the rotation means are lowered; and (ii) power consumption of the rotary-magnetic-head dynamic track following device is reduced.

Moreover, in order to achieve the above objectives, still another rotary-magnetic-head dynamic track following device of the present invention is provided with at least the following means.

(1) rotation means for generating a torque (for example, a motor section).

(2) magnetic field generating means for generating a first constant magnetic flux, the magnetic field generating means being disposed around a rotation shaft of the rotation means (for example, a permanent magnet).

(3) magnetic-head displacement-adjusting means (for example, a head displacement-adjusting mechanism) that is constituted of a fixed section connected to the rotation means; a shiftable section for generating a second magnetic flux in accordance with a detection signal and for shifting itself along the rotation shaft through the interaction between the first magnetic flux and the second magnetic flux (for example, an insulator cylinder or a bobbin whereon a coil is provided); a head support section whereto the magnetic head is fixed (for example, a support spring or a head support member); and a connecting section that links the fixed section, the shiftable section and the head support section.

(4) yoke means that is provided with a ring-shaped empty chamber and that houses the magnetic field generating means as well as the magnetic-head displacement-adjusting means in the ring-shaped empty chamber in such a manner that the first magnetic flux forms a closed loop, the yoke means being connected to the rotation means (for example, a ring-shaped yoke, a cylinder yoke, an upper yoke, or a lower yoke).

In the above arrangement, the magnetic field generating means is disposed in a ring shape around the rotation shaft inside the empty chamber of the yoke means; this makes it possible to provide a sufficient space for the installation of the rotary-magnetic-head dynamic track following device as well as furnishing a sufficient overlapping area between the magnetic field generating means and the yoke means even in the case where compactness and light weight of the rotary-magnetic-head dynamic track following device are intended. Thus, the magnetic field generating means to be installed has superior magnetic characteristics, and the increased magnetic resistance can be avoided. Further, the magnetic field generating means and the magnetic-head displacement-adjusting means are housed inside the yoke means; this minimizes the magnetic resistance. Therefore, the first magnetic flux generated by the magnetic field generating means can form a closed loop with high magnetic-flux density.

As a result, without reducing the spring constant of the head support section or without increasing the electric current to be supplied to the shiftable section, superior electric current sensitivity is obtained in the magnetic-head displacement-adjusting means. Thus, such problems as vacillation of recorded tracks and occurrence of track runout during reproduction that are caused by disturbance due to improper tape tension during recording and thermal deformation of the magnetic-head displacement-adjusting means are prevented.

Furthermore, in order to achieve the above objectives, still another rotary-magnetic-head dynamic track following device of the present invention is provided with at least the following means.

(1) a fixed drum whereon the magnetic tape slides (for example, a lower drum).

(2) a fixed shaft that is secured to the center of the fixed drum, being aligned to the center axis of the fixed drum.

(3) a rotary cylinder that is rotatably secured to the fixed shaft.

(4) a rotary drum that rotates and slides while being kept in contact with the magnetic tape (for example, an upper drum).

(5) rotative driving means (for example, a motor) having an armature section (for example, a driving coil) that is coupled and fixed to the fixed shaft; and a field magnet section that is rotatively driven by the armature section.

(6) magnetic-head displacement-adjusting means (for example, a head displacement adjusting mechanism) having a head support member whereto the magnetic head is fixed (for example, an upper support spring or a lower support spring); a driving coil (for example, a coil) and a magnetic circuit (for example, a ring-shaped yoke) that shift the head support member along the fixed shaft in either direction.

(7) a rotary transformer having a fixed transformer core section (for example, a stator transformer core) that is coupled and fixed to the fixed shaft; and a rotary transformer core section (for example, a rotor transformer core) that is aligned face to face with the fixed transformer core section.

Here, the rotary drum, the field magnet section, the magnetic-head displacement-adjusting means, and the rotary transformer core section, which are all coupled to the rotary cylinder, are rotated as one unit.

In the above arrangement, movable sections, which refer to the rotary drum, the field magnet section, the magnetic-head displacement-adjusting means and the rotary transformer core section, are all coupled to the rotary cylinder. With this arrangement, these movable sections are functionally and intensively disposed around the rotary cylinder to achieve compactness, and thus rotated as one unit around the fixed shaft that is supported by the fixed drum.

As a result, it becomes possible to house all the rotative driving means, the magnetic-head displacement-adjusting means and the rotary transformer into an inner space formed within a frame that is constituted by the rotary drum and the fixed drum; thus, compactness of the rotary-magnetic-head dynamic track following device is achieved, thereby providing a rotary-magnetic-head dynamic track following device that is suitably applied to magnetic recording-reproduction apparatuses for high-density recording.

In addition, if at least one of the rotary drum, the fixed drum, the rotary cylinder and the rotary transformer core section is adapted to form part of the magnetic circuit, the rotary-magnetic-head dynamic track following device will be made further compact.

For a fuller understanding of the nature and advantages of the invention, reference should be made to the ensuing detailed description taken in conjunction with the accompanying drawings.

BRIEF DESCRIPTION OF THE DRAWING

FIG. 10 is a vertical sectional view showing still another structural example of the rotary-magnetic-head dynamic track following device of the present invention.

DESCRIPTION OF THE EMBODIMENTS

First Embodiment

Referring to FIGS. 1 through 7, the following description will discuss the first embodiment of the present invention.

Figure 1:
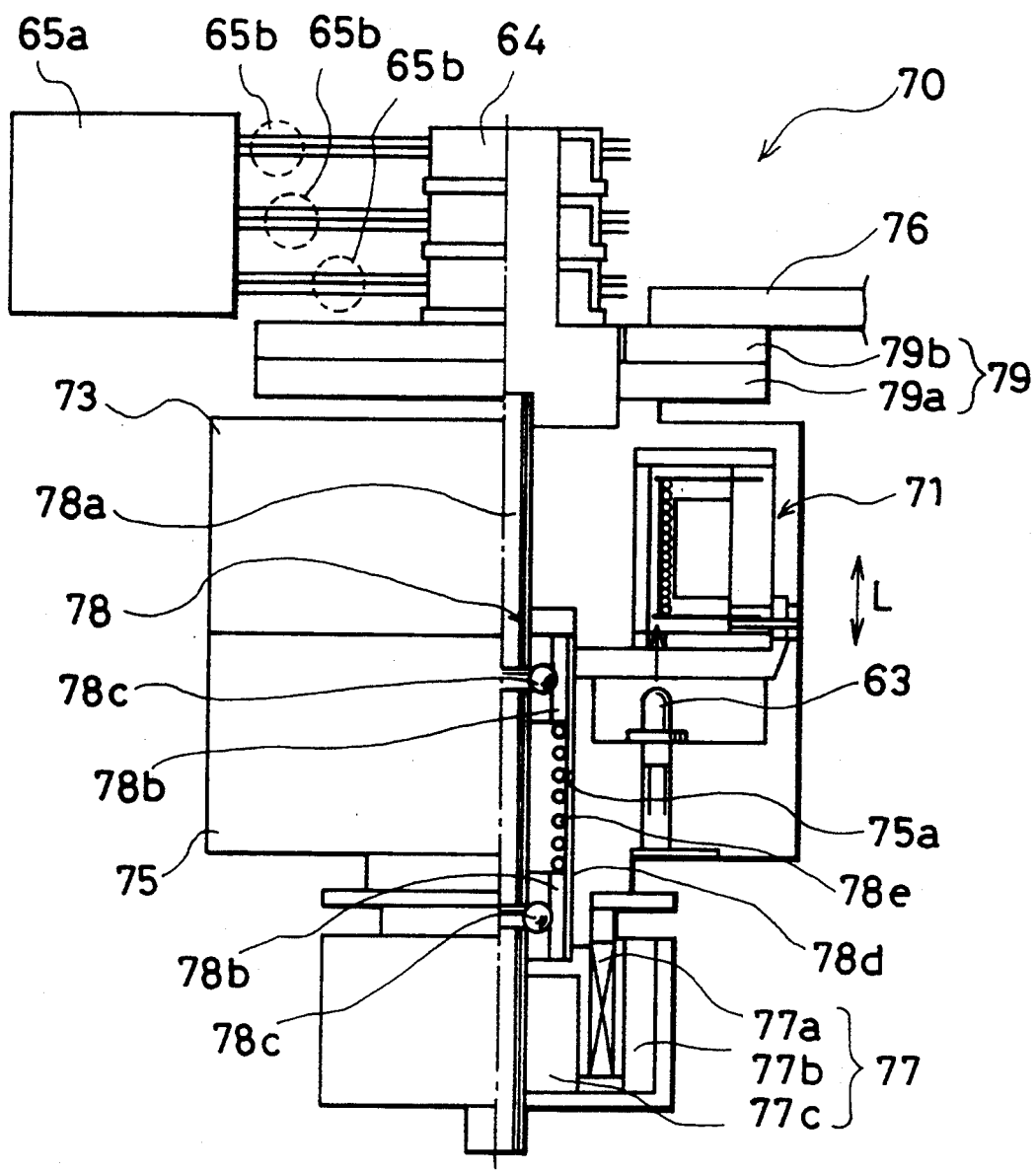
FIG. 1 is a schematic vertical sectional view of a main portion showing one structural example of a rotary-magnetic-head dynamic track following device in accordance with the present invention.

As schematically illustrated in FIG. 1, a rotary-magnetic-head dynamic track following device 70 is constituted of a head moving mechanism 71, a rotary drum 73, a fixed drum 75, a motor section 77, a bearing 78 integral with a shaft, and a rotary transformer 79.

The fixed drum 75 has a cylinder shape. A shaft-receiving hole 75a is formed in the center of the fixed drum 75, and is perpendicular to the upper surface of the fixed drum 75. Further, a recessed portion is formed on the upper surface of the fixed drum 75 with a predetermined space apart from the shaft-receiving hole 75a. A position sensor 63 is installed in the recessed portion. The shaft of the bearing 78 is inserted through the shaft-receiving hole 75a.

The bearing 78 integral with the shaft is constituted of a shaft 78a, a pair of upper and lower outer rings 78b, a plurality of upper and lower balls 78c, a collar 78d, and a pre-load spring 78e. This structure is the same as that of the prior art; therefore, an explanation thereof is omitted.

The motor section 77 is installed at the lower side of the fixed drum 75. The motor section 77 is constituted of a motor stator 77a, a motor rotor 77b, and a collar 77c. This structure is the same as that of the prior art; therefore, an explanation thereof is omitted.

The cylinder-like rotary drum 73 is installed on the upper side of the fixed drum 75. The rotary drum 73 is fixed to the shaft 78a that is protruding from the upper surface of the fixed drum 75. The rotary drum 73 is provided with a ring-shaped and U-shaped groove having an opening in the bottom surface of the rotary drum 73. This groove is formed in the shape of a ring with the shaft 78a centered therein such that the center of the inner and outer edges of the groove coincide with the center of the bottom surface of the rotary drum 73. The head moving mechanism 71 is fixed inside the groove in the shape of a ring. A rotary transformer 79 is disposed on the upper surface of the rotary drum 73.

The rotary transformer 79 is constituted of a ring-shaped rotor transformer 79a and a stator transformer 79b. The rotor transformer 79a is securely fixed to the upper surface of the rotary drum 73. The rotor transformer 79a and the stator transformer 79b are aligned face to face with each other having a slight space in between. The stator transformer 79b is secured to a support arm 76. A slip ring 64, which is inserted into the ring-shaped rotor transformer 79a and the stator transformer 79b, is securely mounted on the rotary drum 73.

The rotary-magnetic-head dynamic track following device 70 is constituted as described above. The slip ring 64 contacts a brush 65b that is supported by a support member 65a. Thus, the slip ring 64 is electrically connected to the brush 65b.

Figure 2:
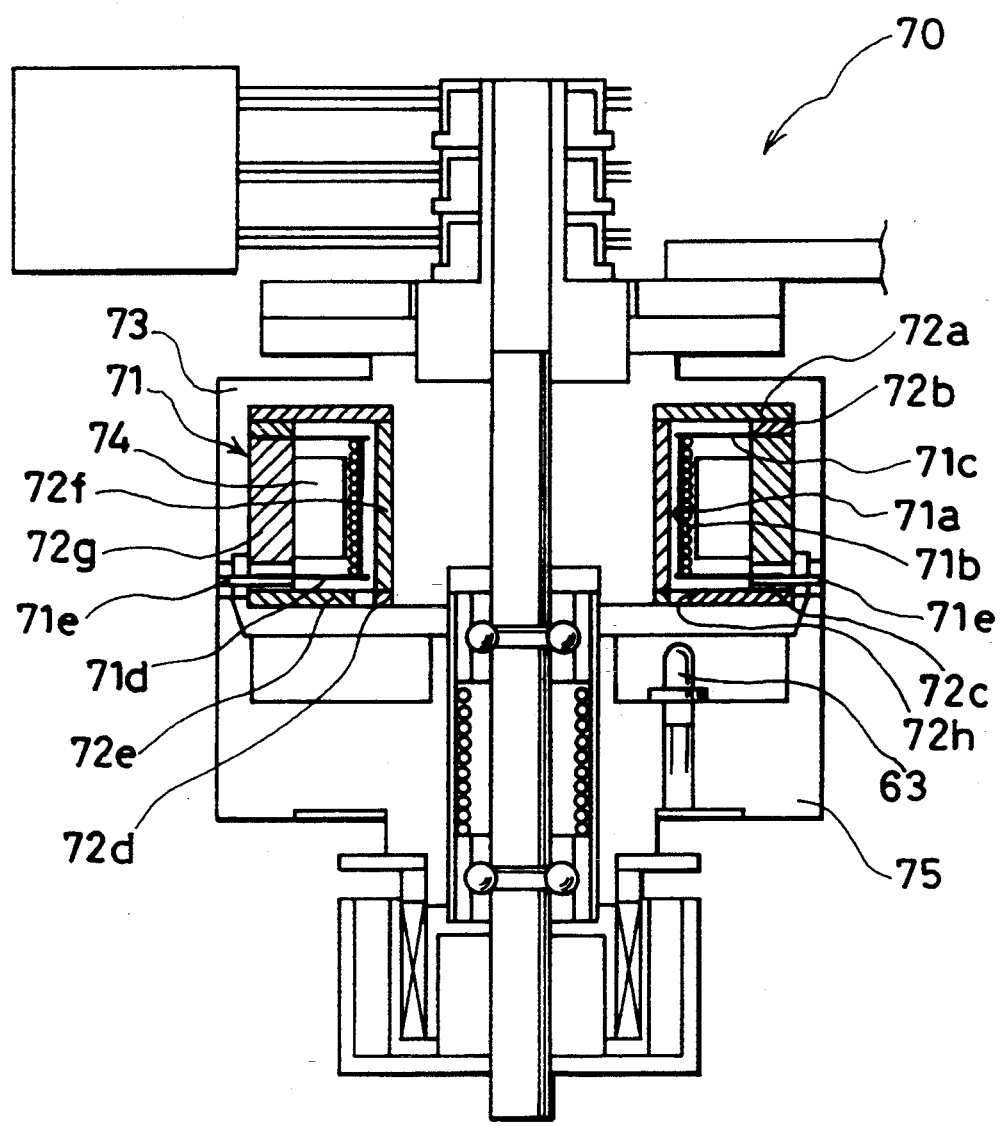
FIG. 2 is a vertical sectional view of a main portion schematically showing the structure of a head moving mechanism that is installed in the rotary-magnetic-head dynamic track following device of FIG. 1.

Referring to FIG. 2, the following description will discuss the head moving mechanism 71. The head moving mechanism 71 is installed in the ring-shaped groove that is formed so as to have an opening in the bottom surface of the rotary drum 73. The head moving mechanism 71 is constituted of a yoke section, a permanent magnet 74 and a head movable section.

The yoke section is constituted of an upper surface ring-shaped yoke 72a, an upper ring-shaped yoke 72b, a lower ring-shaped yoke 72c, an inner bottom surface ring-shaped yoke 72d, an outer bottom surface ring-shaped yoke 72e, an inner cylindrical yoke 72f, and an outer cylindrical yoke 72g.

The outer bottom surface ring-shaped yoke 72e is disposed in the shape of a ring along the inner wall of the outer edge of the groove, and the upper ring-shaped yoke 72b also has a ring shape with almost the same diameter as the outer bottom surface ring-shaped yoke 72e. The lower ring-shaped yoke 72c, which has almost the same diameter as the outer bottom surface ring-shaped yoke 72e, has a cut-out in one portion thereof (see FIG. 5). Further, a cut-out area is formed in the lower end section of the outer cylindrical yoke 72g in such a manner that it fits to the cut-out of the lower ring-shaped yoke 72c.

The inner cylindrical yoke 72f is disposed inside the outer cylindrical yoke 72g in such a manner that it forms a cylinder along the wall of the inner edge of the groove. The upper surface ring-shaped yoke 72a, which has a hole in the center thereof with a diameter that is equal to the inner diameter of the groove, is fixed to the upper end section of the inner cylindrical yoke 72f. Here, the outer diameter of the upper surface ring-shaped yoke 72a is equal to the outer diameter of the groove.

The inner bottom surface ring-shaped yoke 72d, which has almost the same diameter as the inner cylindrical yoke 72f, is fixed to the lower end section of the inner cylindrical yoke 72f. A ring-shaped slit 72h is formed between the inner bottom surface ring-shaped yoke 72d and the outer bottom surface ring-shaped yoke 72e. Thus, the yoke section is installed in the groove so that a ring-shaped empty chamber is formed inside thereof, centered on the shaft 78a. The permanent magnet 74 and the head movable section are installed inside this chamber. Here, in the yoke section, the cut-out of the lower ring-shaped yoke 72c and the cut-out area of the outer cylindrical yoke 72g provide a window through which the magnetic head 71e is exposed.

The permanent magnet 74, which forms a ring along the inner wall of the outer cylindrical yoke 72g, is fixed to the center section of the inner wall of the outer cylindrical yoke 72g. The permanent magnet 74 is magnetized in the radial direction of the rotary drum 73. The yoke section is made of a material that allows magnetic fluxes to pass therethrough; therefore, a magnetic flux, which is exerted by the head moving mechanism 71, forms a closed loop in the yoke section.

The head movable section is constituted of an insulator 71a, a coil 71b, an upper support spring 71c, a lower support spring 71d, and a magnetic head 71e. The circumferential edge of the upper support spring 71c which is a circular plate spring, is sandwiched and supported by the upper ring-shaped yoke 72b and the outer cylindrical yoke 72g. Similarly, the circumferential edge of the lower support spring 71d which is a circular plate spring, is sandwiched and supported by the lower ring-shaped yoke 72c and the outer cylindrical yoke 72g. The coil 71b is wound around the cylindrical insulator 71a whose upper end is fixed to the upper support spring 71c and whose lower end is fixed to the lower support spring 71d.

A plurality of the magnetic heads 71e are accurately secured to the lower support spring 71d so that they have a predetermined angle with respect to one another. The magnetic heads 71e are exposed out of the rotary drum 73 along its circumferential surface through the cut-out area formed in the yoke section and the rotary drum 73.

Figure 3:
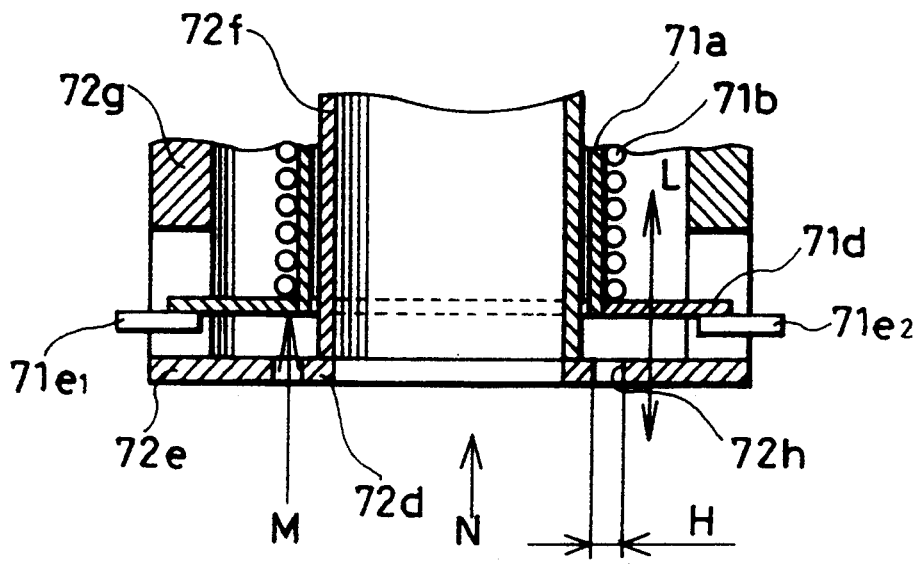
FIG. 3 is an enlarged vertical sectional view showing the structure of the head moving mechanism of FIG. 2.
Figure 4:
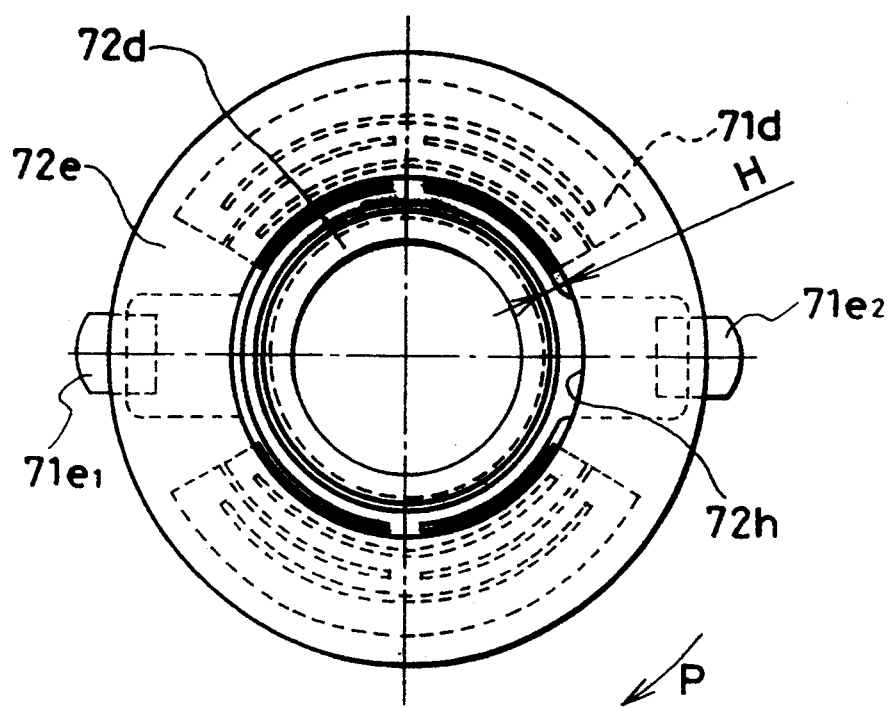
FIG. 4 is a bottom view of the head moving mechanism of FIG. 3, when seen in the direction of an arrow N.

Referring to FIG. 3 and FIG. 4, the following description will discuss the head moving mechanism 71 having the above-mentioned arrangement, which is seen from the position sensor 63 side. Here, FIGS. 3 and 4 exemplify the case wherein two magnetic heads are installed in the head moving mechanism.

In FIGS. 3 and 4, the ring-shaped slit 72h is formed between the inner bottom surface ring-shaped yoke 72d and the outer bottom surface ring-shaped yoke 72e. The position sensor 63 (see FIG. 6) is disposed below the ring-shaped slit 72h. The position sensor 63 detects the position of the lower support spring 71d in the directions of arrows L through the ring-shaped slit 72h, as is indicated by an arrow M. The position of the lower support spring 71d corresponds to the position of each of the magnetic heads 71e (71e$_1$, 71e$_2$).

With this arrangement, since the slit 72h has a ring shape, the ring-shaped slit 72h is always located above the position sensor 63 even if the magnetic head 71e rotates in the direction indicated by an arrow P. Thus, the position of the magnetic head 71e is always detected by the position sensor 63. The width of the ring-shaped slit 72h is preferably made as small as possible so as to minimize leakage fluxes.

Figure 5:
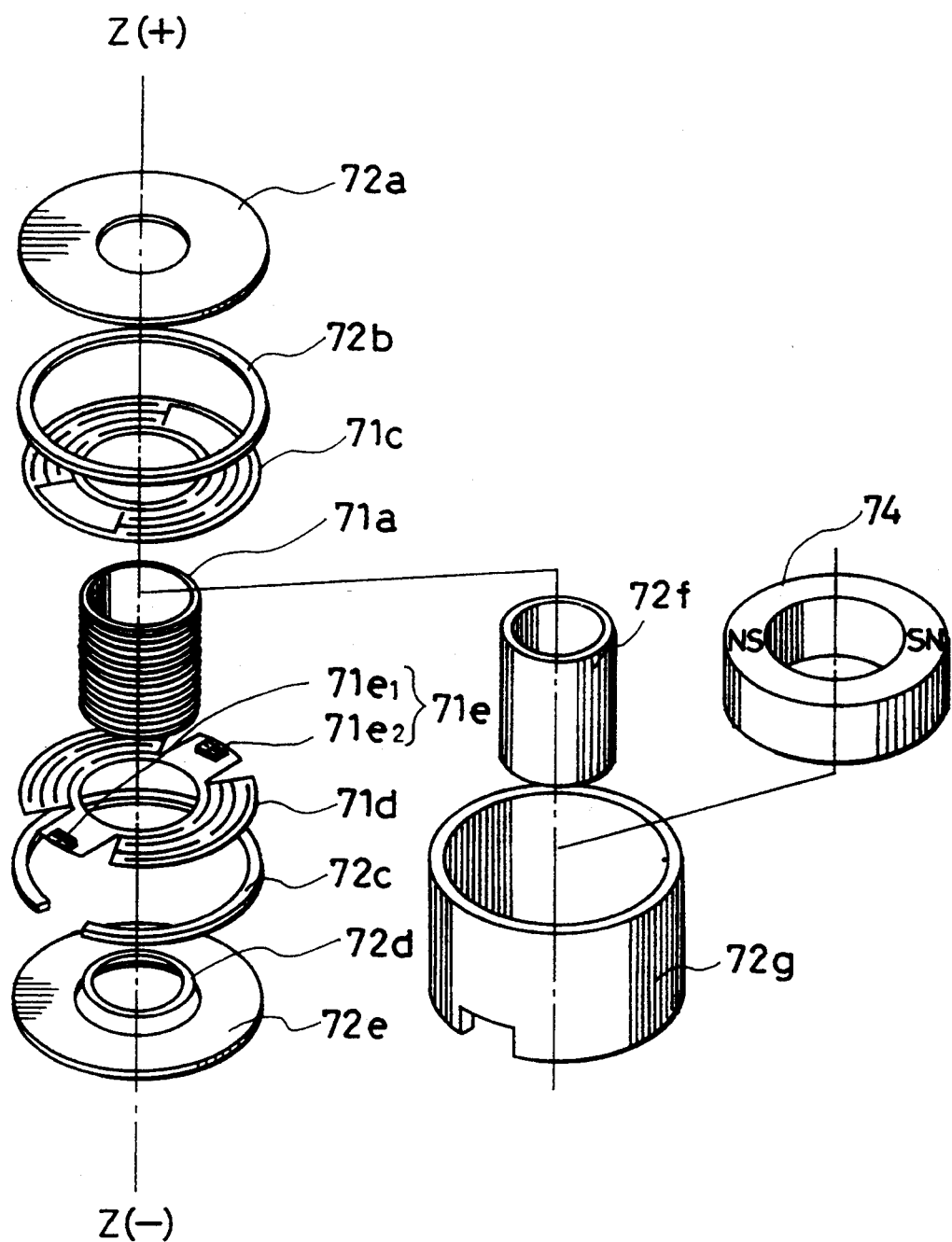
FIG. 5 is an exploded perspective view showing the assembly of the head moving mechanism of FIG. 2.

Referring to FIG. 5, the following description will discuss the above-mentioned head moving mechanism 71 and the assembly of the rotary-magnetic-head dynamic track following device 70 provided with the head moving mechanism 71. Here, FIG. 5 exemplifies the case wherein two magnetic heads are installed in the head moving mechanism.

First, two magnetic heads 71e are accurately secured to the lower support spring 71d so as to be aligned face to face 180 degrees apart, and the cylindrical insulator 71a is provided with the coil 71b. Next, the lower support spring 71d is fixed to the lower end of the insulator 71a. On the other hand, the permanent magnet 74 is fixed to the center section of the inner wall of the outer cylindrical yoke 72g. Then, the insulator 71a is inserted into the outer cylindrical yoke 72g in the Z-axis (−) direction.

In this case, the circumferential edge of the lower support spring 71d is fixed to the lower end of the outer cylindrical yoke 72g. Further, the inner cylindrical yoke 72f is inserted inside the insulator 71a. Furthermore, the lower ring-shaped yoke 72c is fixed to the lower end of the outer cylindrical yoke 72g and the circumferential edge of the lower support spring 71d in the Z-axis (−) direction. Then, the upper support spring 71c is fixed to the upper end of the insulator 71a and the upper end of the outer cylindrical yoke 72g in the Z-axis (+) direction. The upper ring-shaped yoke 72b is fixed to the upper end of the outer cylindrical yoke 72g and the circumferential edge of the upper support spring 71c in the Z-axis (+) direction.

Next, the upper surface ring-shaped yoke 72a is fixed to the upper ring-shaped yoke 72b in the Z-axis (+) direction. The inner bottom surface ring-shaped yoke 72d is fixed to the lower edge of the inner cylindrical yoke 72f in the Z-axis (−) direction. The outer bottom surface ring-shaped yoke 72e is fixed to the lower ring-shaped yoke 72c in the Z-axis (−) direction. In this way, the head moving mechanism 71 is assembled.

Figure 6:
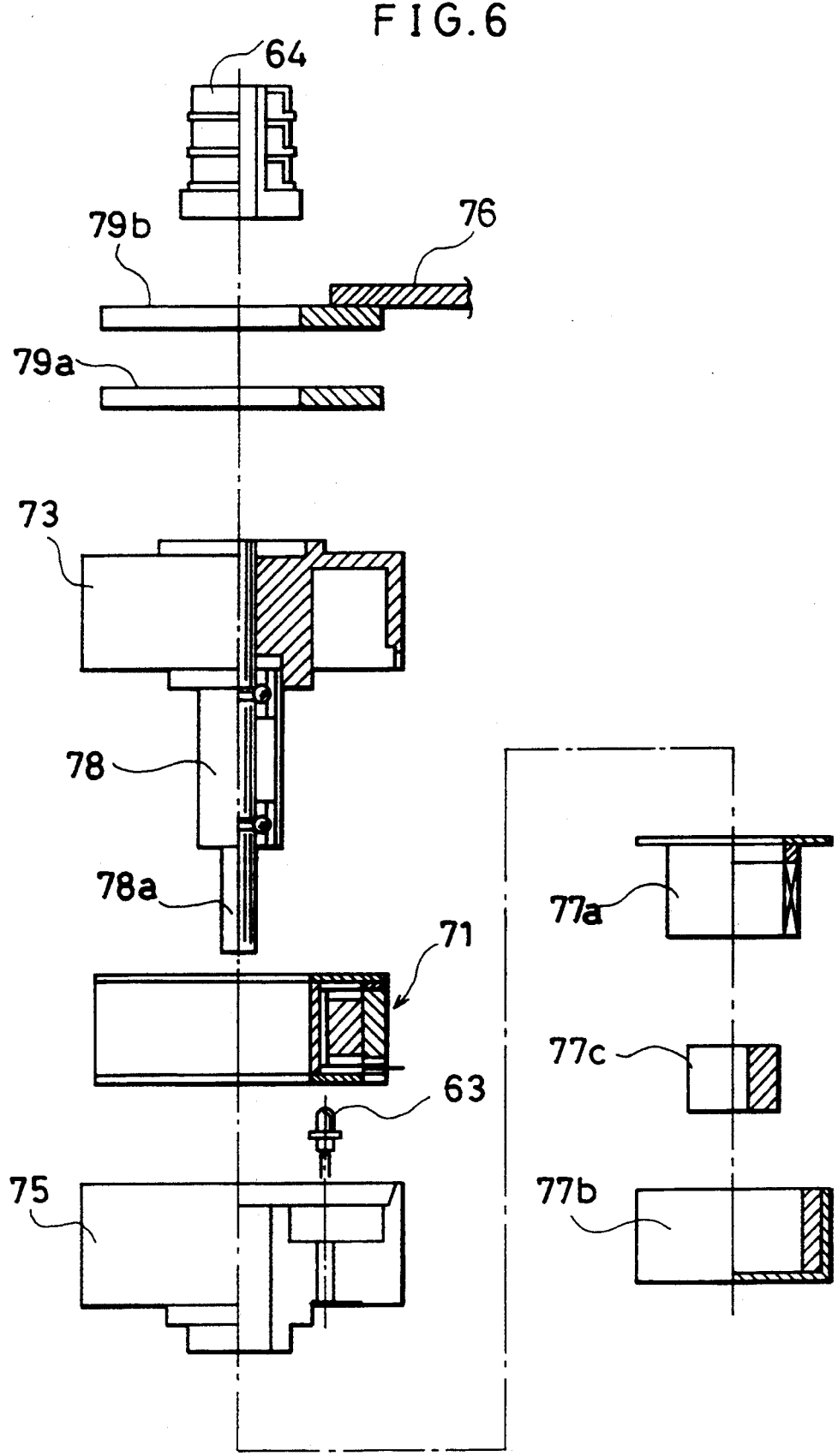
FIG. 6 is an exploded vertical sectional view of a main portion schematically showing the assembly of the rotary-magnetic-head dynamic track following device of FIG. 2.

Referring to FIG. 6, the following description will discuss the assembly of the rotary-magnetic-head dynamic track following device 70 provided with the above-mentioned head moving mechanism 71.

First, a bearing 78 integral with a shaft is shrink fitted to the rotary drum 73. The rotor transformer 79a and the slip ring 64 are securely fixed to the upper surface of the rotary drum 73. The assembled head moving mechanism 71, which is shown in FIG. 5, is incorporated in the ring-shaped groove that is formed with an opening in the bottom surface of the rotary drum 73. At this time, the ends of the coil are appropriately treated with respect to the rotary drum 73 and the head moving mechanism 71.

Then, the position sensor 63 is fixed to the recessed section formed in the upper surface of the fixed drum 75. The shaft of the bearing 78 is inserted into the fixed drum 75. The motor stator 77a is securely fixed to the raised section formed on the bottom surface of the fixed drum 75. The collar 77c is fixed to the lower end of the shaft 78a which is integral with the bearing 78 and which sticks out from the bottom surface of the fixed drum 75. Finally, after the collar 77c has been provided, the motor rotor 77b is securely fixed to the collar 77c so that it is disposed face to face with the motor stator 77a, thereby completing the assembly of the rotary-magnetic-head dynamic track following device 70.

Referring to FIGS. 1 and 2, the following description will discuss the operation of the rotary-magnetic-head dynamic track following device 70 provided with the head moving mechanism 71.

First, the motor rotor 77b of the motor section 77 is rotated. The torque of the motor rotor 77b is transmitted to the rotary drum 73 through the smooth rotation of the shaft 78a that is integral with the bearing 78. Thus, the rotary drum 73 rotates. During the rotation of the rotary drum 73, the position of the lower support spring 71d is always detected by the position sensor 63 through the ring-shaped slit 72h. According to the detection, a controlling current is supplied to the coil 71b through the brush 65b and the slip ring 64.

When the controlling current is supplied to the coil 71b, the insulator 71a is shifted in the L direction from the origin due to the influence of the magnetic flux of the permanent magnet 74. Here, the permanent magnet 74 is installed in the empty chamber of the yoke section in the shape of a ring, and covered by the yoke section in the shape of a ring; thus, the magnetic flux forms a closed loop. Therefore, even if the head moving mechanism 71 is contracted in proportion to the contractions of the diameter and the height of the rotary-magnetic-head dynamic track following device 70, the magnetic properties of the permanent magnet 74 will not be reduced. Further, since the overlapping area of the inner cylindrical yoke 72f and the permanent magnet 74 is not reduced, the magnetic resistance is not increased. With this arrangement, the head moving mechanism 71 has improved electric current sensitivity.

When the insulator 71a is shifted in the L direction from the origin as described above, the upper support spring 71c and the lower support spring 71d are moved in the same direction. As the insulator 71a is shifted, the magnetic head 71e is also moved in the L direction from the origin. Thus, the magnetic head 71e is moved to a desired position.

A reproduced signal from the magnetic head 71e is sent to the peripheral devices through the rotor transformer 79a and the stator transformer 79b. Further, a recording signal is supplied to the magnetic head 71e from the peripheral devices through the stator transformer 79b and the rotor transformer 79a.

Figure 22:
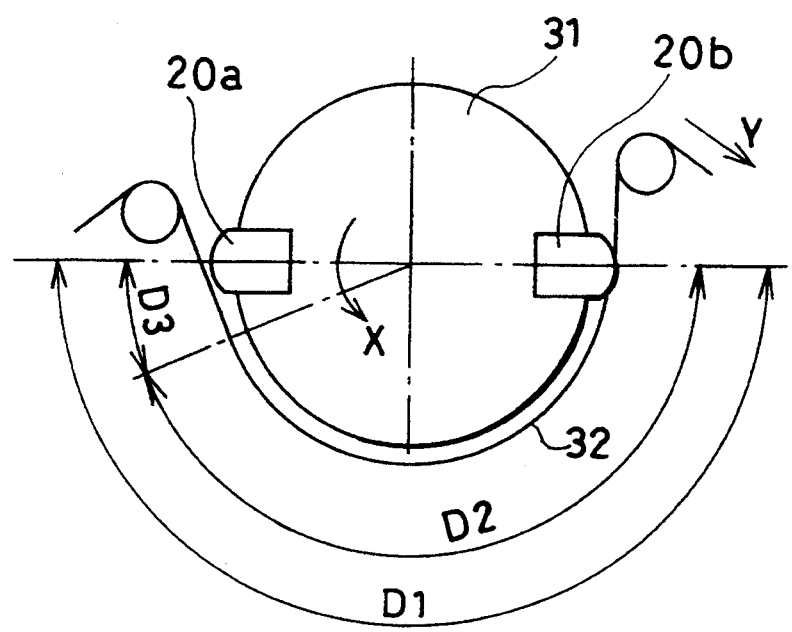
FIG. 22 is an explanatory drawing showing the relationship between the location of the magnetic heads and the contact angle of the magnetic tape in the case of two magnetic heads that are aligned 180 degrees apart.
Figure 23:
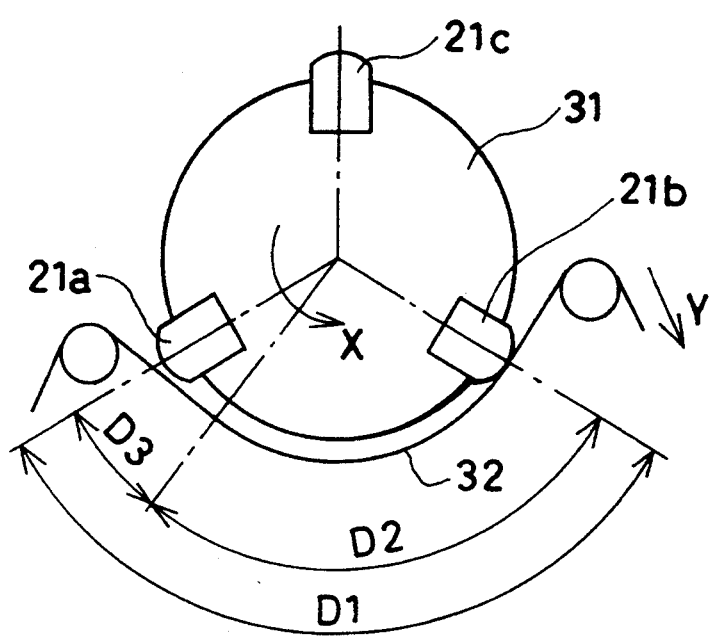
FIG. 23 is an explanatory drawing showing the relationship between the location of the magnetic heads and the contact angle of the magnetic tape in the case of three magnetic heads that are aligned 120 degrees apart.
Figure 24:
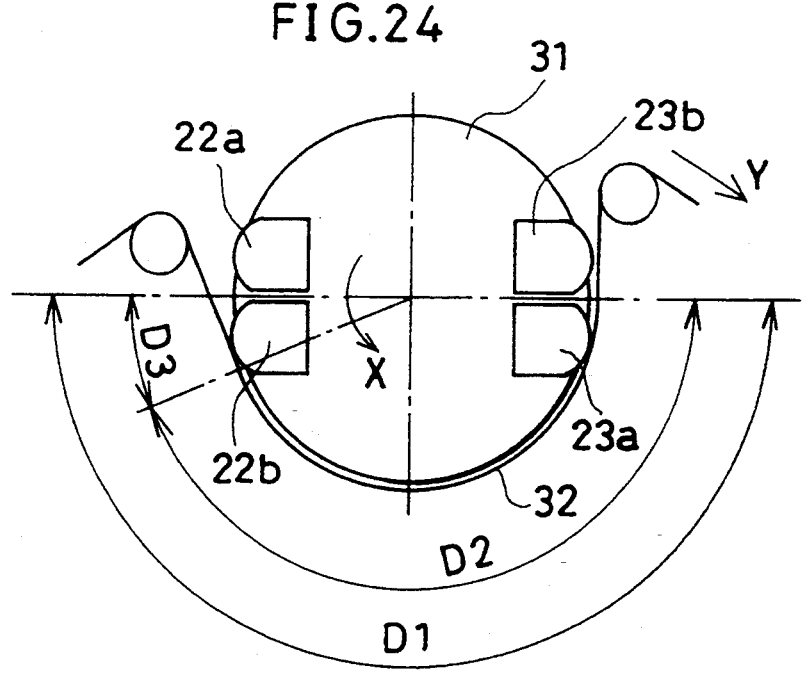
FIG. 24 is an explanatory drawing showing the relationship between the location of the magnetic heads and the contact angle of the magnetic tape in the case of two sets of magnetic heads that are aligned 180 degrees apart, where one set refers to a pair of magnetic heads.
Figure 25:
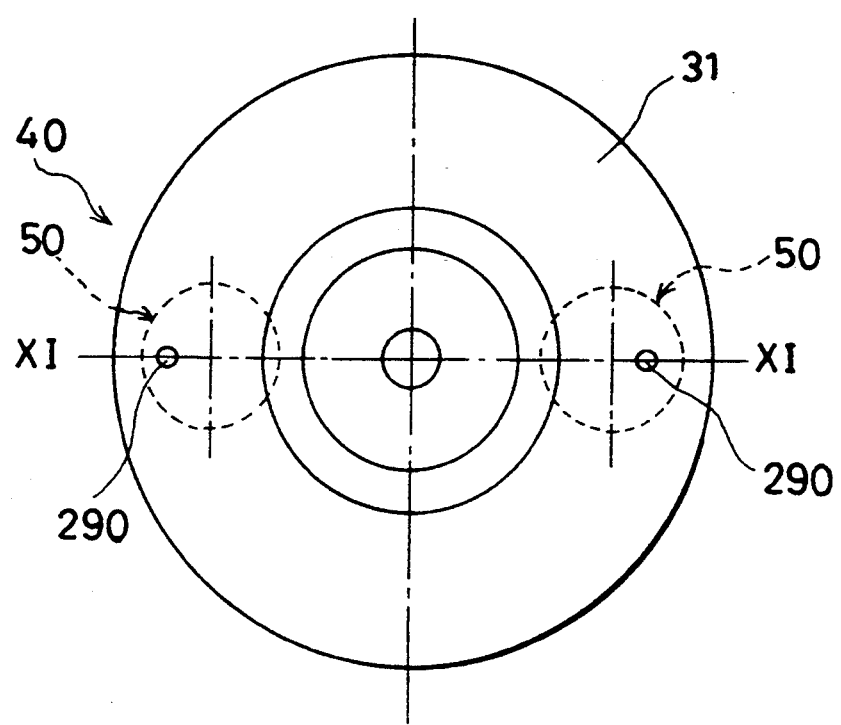
FIG. 25 is a plan view showing a rotary-magnetic-head dynamic track following device that has a conventional head moving mechanism.
Figure 26:
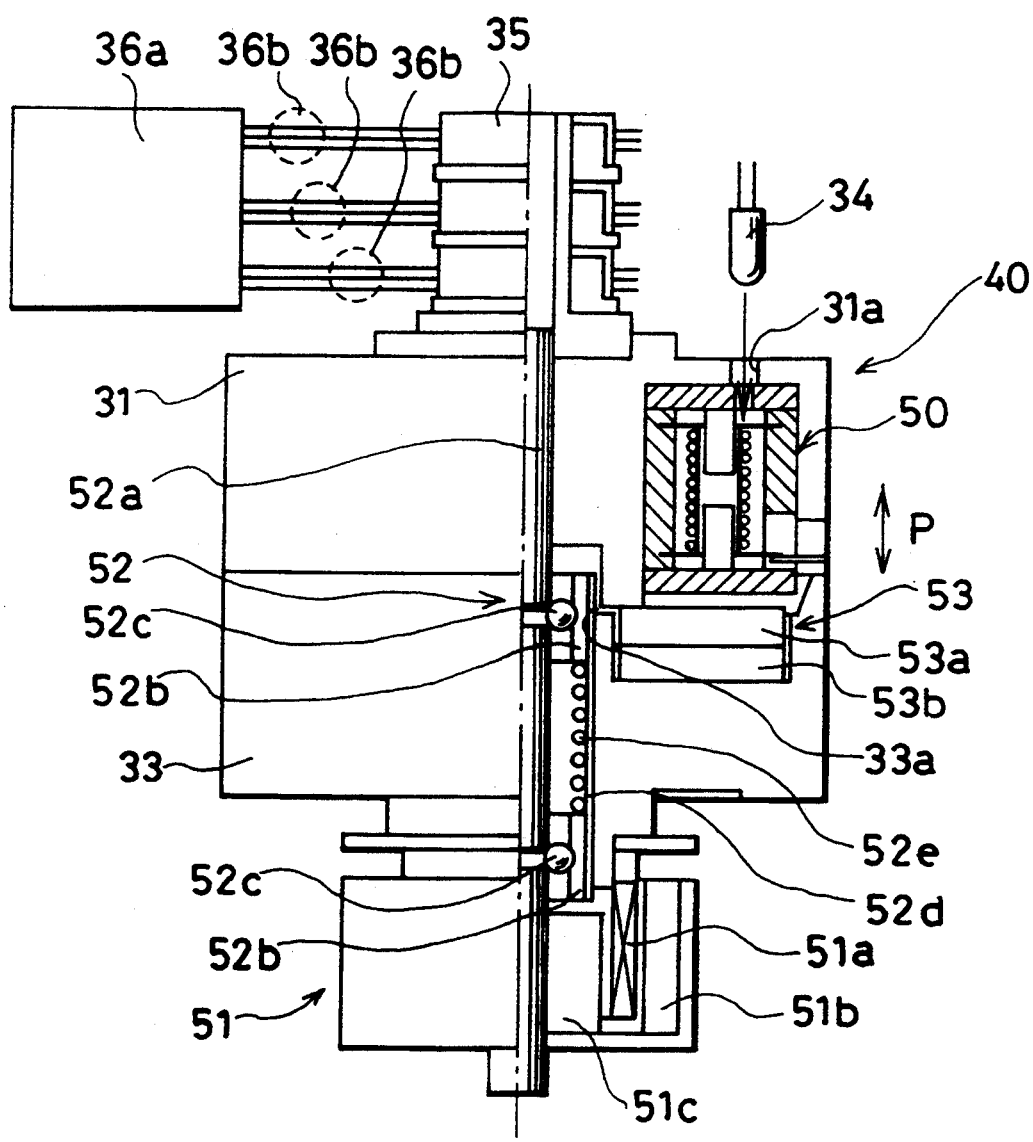
FIG. 26 is a vertical sectional view of a main portion taken along the line XI—XI of FIG. 25.
Figure 27:
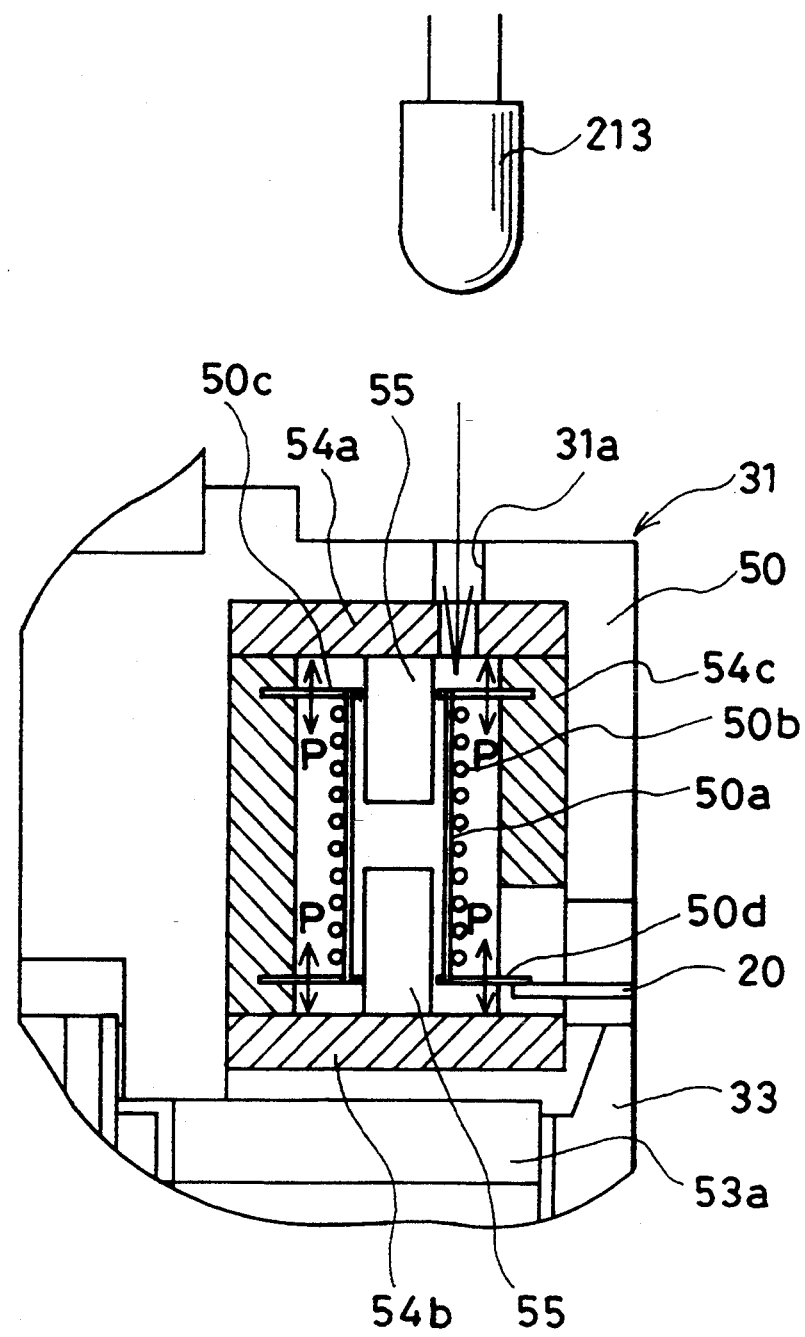
FIG. 27 is a partial sectional view showing the enlarged head moving mechanism that is to be installed in the rotary-magnetic-head dynamic track following device of FIG. 26.
Figure 28:
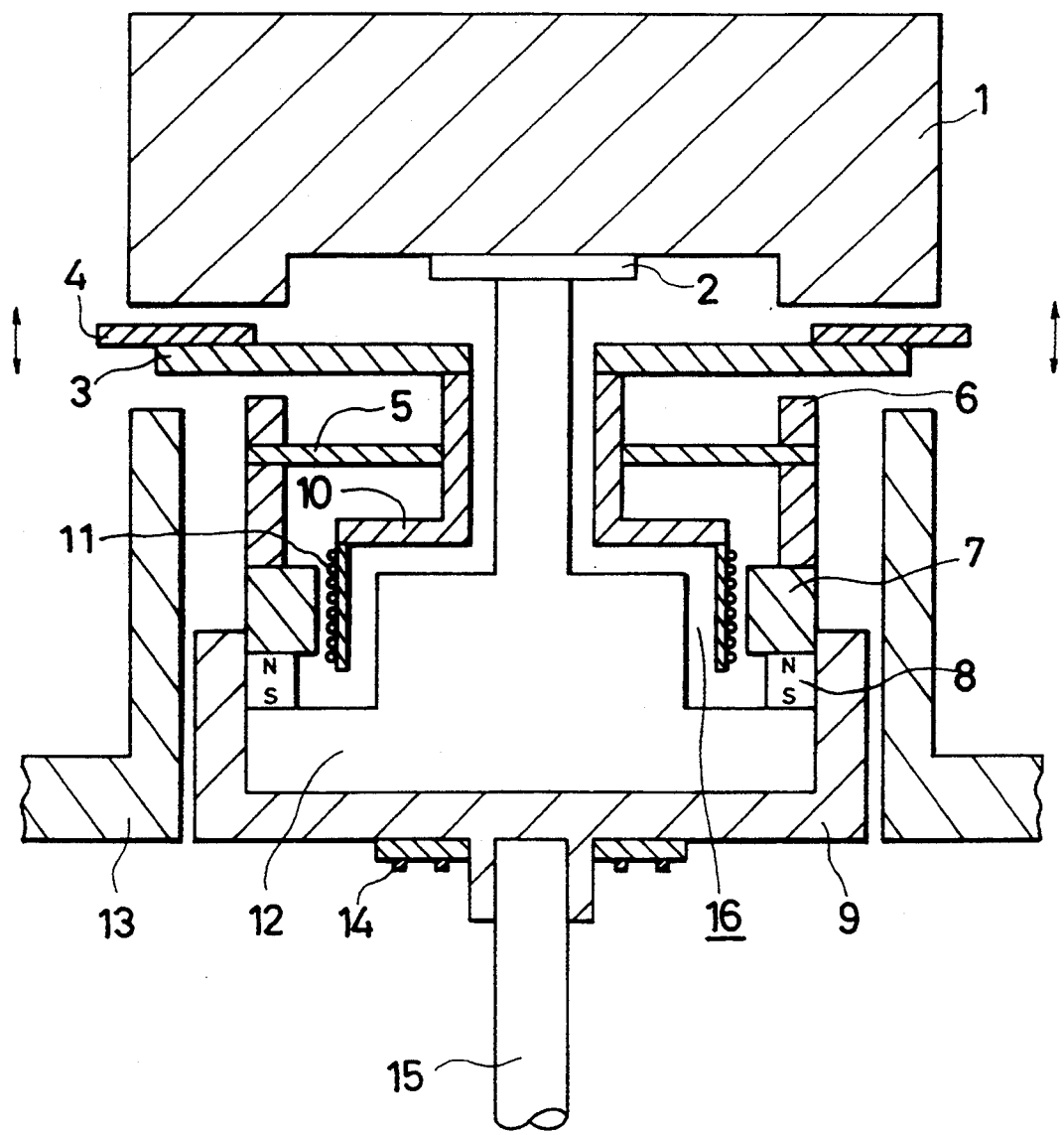
FIG. 28 is a vertical sectional view showing one structural example of a conventional rotary-magnetic-head dynamic track following device.
Figure 29A:
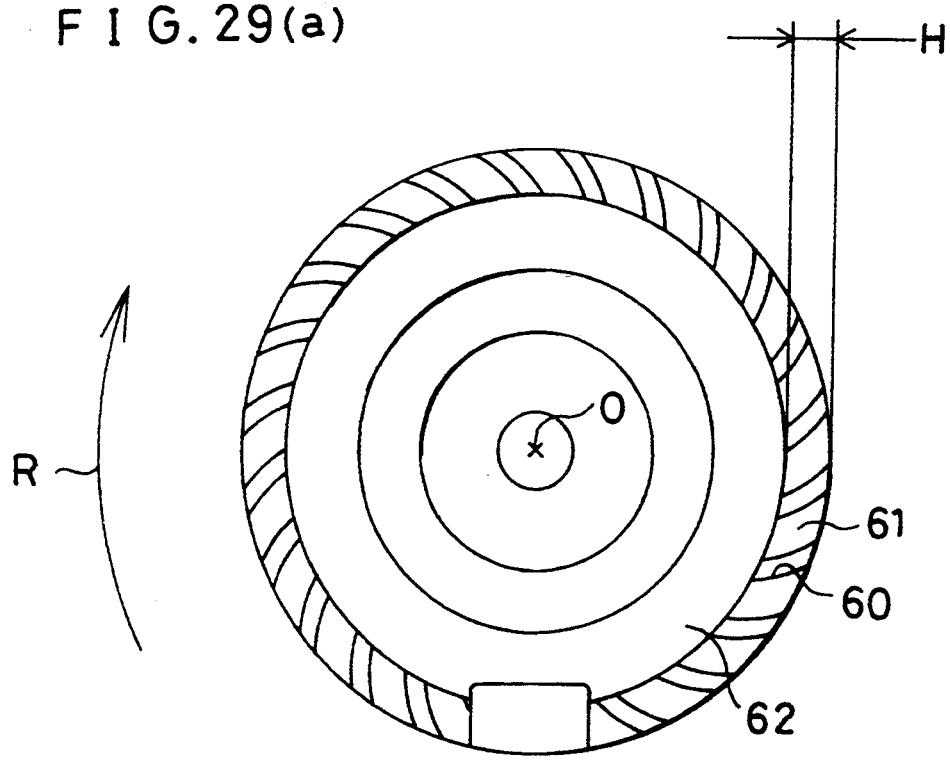
FIG. 29(a) is a plan view showing a rotary drum wherein conventional spiral grooves are formed.
Figure 29B:
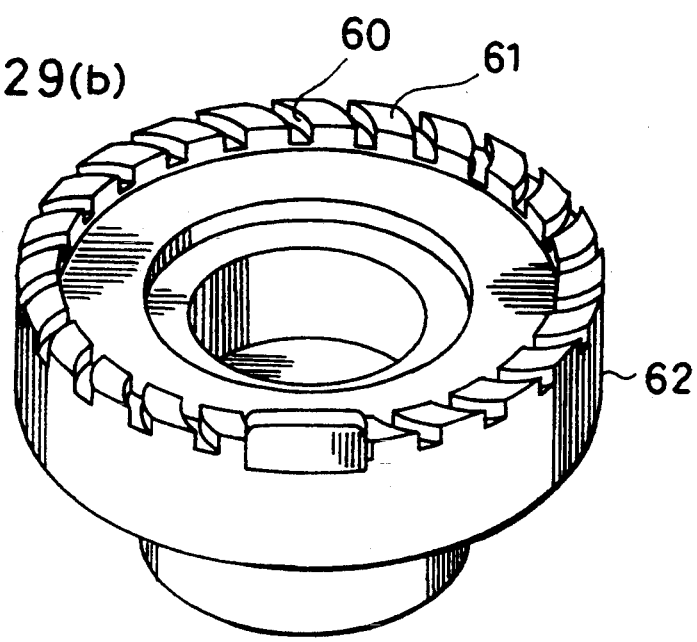
FIG. 29(b) is a perspective view thereof.

Additionally, for example, during reproduction, in the case where the first magnetic head $71e_1$ is last shifted from the origin to a great extent after completion of the reproduction, since the second magnetic head $71e_2$ is fixed to the same lower support spring 71d, the position of the second magnetic head $71e_2$ tends to deviate to a great extent from the appropriate position for starting reproduction. However, as illustrated in FIGS. 22 through 24, even in such a case, in magnetic recording-reproduction apparatuses which have a small effective contact angle of the magnetic tape with respect to the angle made by the respective magnetic heads, when the controlling current is cut within angle $D_3$, the second magnetic head $71e_2$ can return to the origin before starting reproduction.

Figure 7:
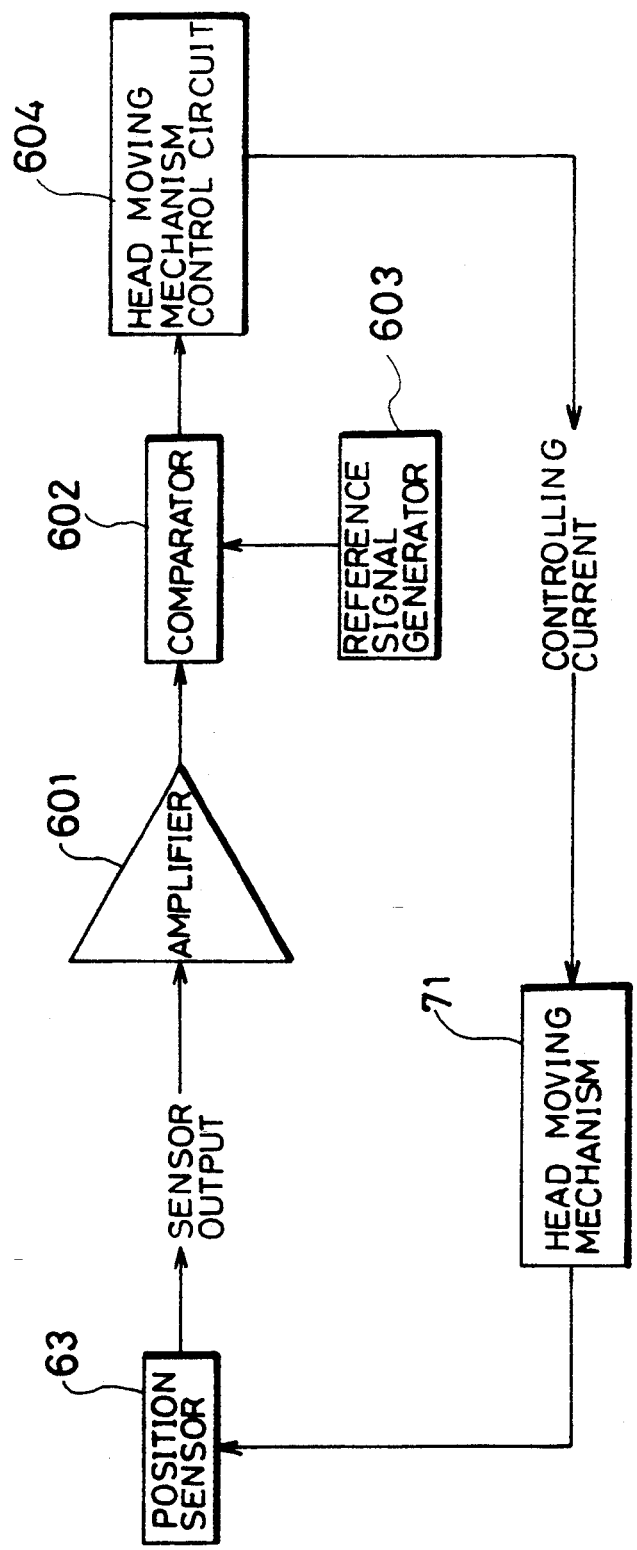
FIG. 7 is an explanatory drawing showing the generating process of a controlling current to be supplied to the head moving mechanism of FIG. 2.

Referring to FIG. 7, the following description will discuss the processing process of the signal which indicates the position of the head moving mechanism 71 in the upward or downward direction. Here, the position is optically detected by the position sensor 63.

First, the signal detected by the position sensor 63, as a sensor output, is sent to an amplifier 601 through a signal line. The detected signal is amplified by the amplifier 601, and inputted to a comparator 602. The comparator 602 compares the input signal with a reference signal that is generated by a reference signal generator 603, and a resulting error voltage is supplied to a head moving mechanism control circuit 604.

Here, the reference signal, which is generated by reference signal generator 603, refers to a signal that is adjusted to correspond to a predetermined level of the magnetic head 71e. According to the error voltage inputted thereto, the head moving mechanism control circuit 604 adjusts the amount of the controlling current that is supplied to the head moving mechanism 71.

The controlling current, thus adjusted, is supplied to the head moving mechanism 71. By supplying the controlling current to the head moving mechanism 71, the magnetic head 71e is moved as described earlier.

Second Embodiment

Figure 8:
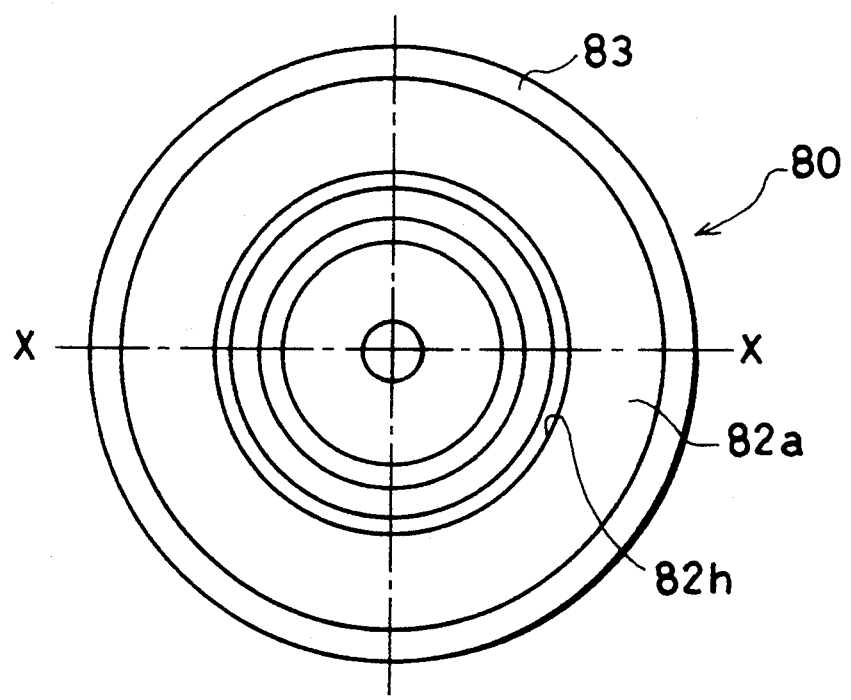
FIG. 8 is a plan view showing another structural example of the rotary-magnetic-head dynamic track following device of the present invention.
Figure 9:
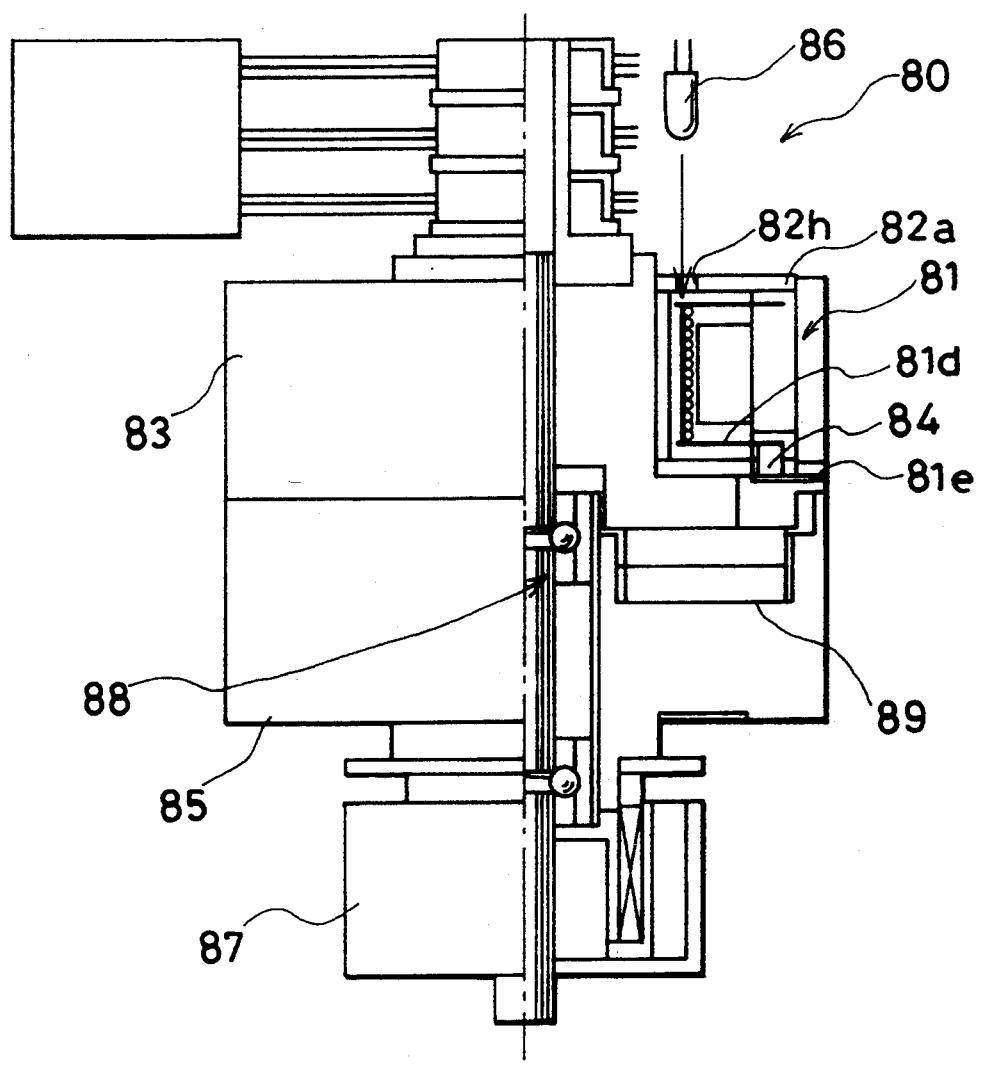
FIG. 9 is a vertical sectional view in a main portion, taken along the line X—X of FIG. 8.

Referring to FIGS. 8 and 9, the following description will discuss another embodiment of the present invention.

FIG. 8 is a plan view showing a rotary-magnetic-head dynamic track following device provided with a head moving mechanism in accordance with another embodiment of the present invention. FIG. 9 is a sectional view taken along the line X—X in FIG. 8.

As illustrated schematically in FIGS. 8 and 9, a rotary-magnetic-head dynamic track following device 80 is constituted of a head moving mechanism 81, a rotary drum 83, a fixed drum 85, a motor section 87, a bearing 88 integral with a shaft, and a rotary transformer 89. In this rotary-magnetic-head dynamic track following device 80, the transformer 89 is installed in a ring-shaped groove that is formed on the upper surface of the fixed drum 85. Further, the head moving mechanism 81 is installed in a ring-shaped groove that is formed so as to have an opening in the upper surface of the rotary drum 83.

Since the head moving mechanism 81 is installed in the groove having the opening in the upper surface of the rotary drum 83 as described above, a fixing member 84 is placed between a lower support spring 81d and a magnetic head 81e, thereby adjusting the position of the magnetic head 81e. Moreover, a ring-shaped slit 82h is formed on an upper surface ring-shaped yoke 82a of the head moving mechanism 81. A position sensor 86 is disposed above the ring-shaped slit 82h. Other structures of this device are the same as those described in the first embodiment; therefore, explanations thereof are omitted.

As described above, the rotary-magnetic-head dynamic track following device 80 has an arrangement wherein the position of the magnetic head 81e is measured from above by installing the position sensor 86 above the rotary drum 83.

Third Embodiment

Referring to FIGS. 10, 12, 14 through 17, the following description will discuss still another embodiment of the present invention.

As illustrated in FIGS. 17(a) through 17(e), a rotary-magnetic-head dynamic track following device 200 of FIG. 10 is mainly constituted of a motor section 110, an upper drum section 100, a bearing section 120, a head displacement adjusting mechanism 130, and a lower drum section 150. The following is a detailed description of each of those sections.

First, the lower drum section 150 is a fixed section that serves as a supporting base of the rotary-magnetic-head dynamic track following device 200, and is provided with a lower drum 152, a stator transformer core 151a, and a sensor 153, as shown in FIG. 10. On the lower drum 152 are formed a central cylinder section 152a having a shaft 121 inserted upright in the center thereof and an outer cylinder section 152b having a face to be in contact with a magnetic tape.

The sensor 153 is buried in the bottom surface of the lower drum 152 so that the sensor face having a light-emitting section and a light-receiving section is exposed therefrom. The stator transformer core 151a, which has an empty cylinder shape, is fitted to the outer face of the central cylinder section 152a. The stator transformer core 151a, which is provided with a stator coil connected to an amplifier, constitutes a rotary transformer (which will be described later) together with a rotor transformer core 151b.

Figure 12:
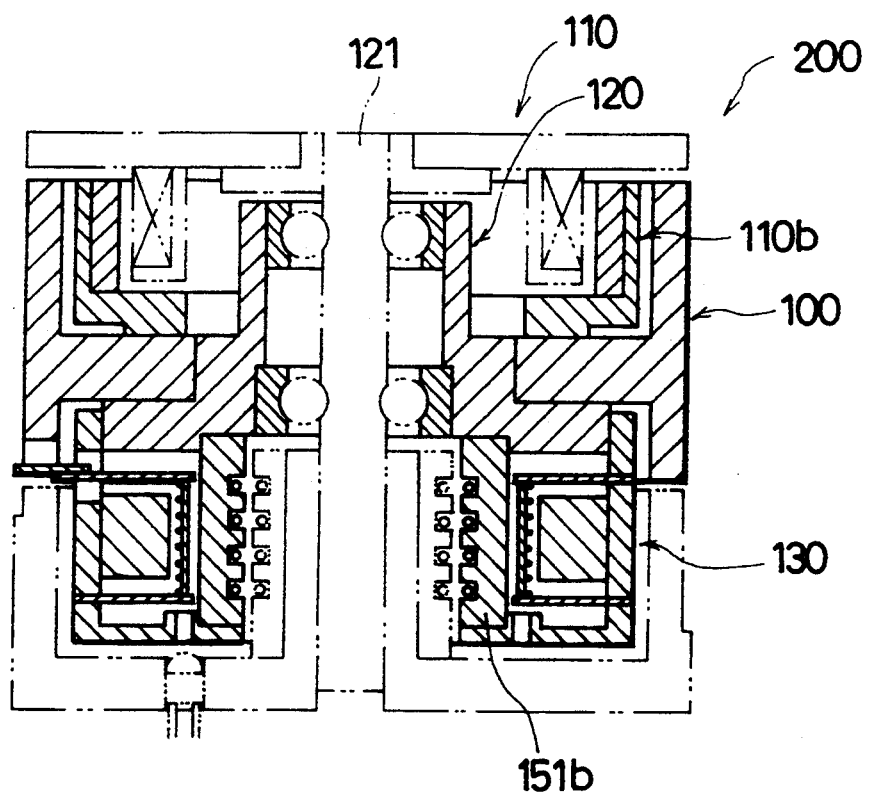
FIG. 12 is a vertical sectional view showing movable sections of the rotary-magnetic-head dynamic track following device of FIG. 10.

FIG. 12 illustrates the movable sections of the rotary-magnetic-head dynamic track following device 200 in solid lines. The movable sections are respectively constituted of the upper drum section 100, a magnetic field generating section 110b in the motor section 110, which will be described later, the bearing section 120, the head displacement adjusting mechanism 130, and the rotor transformer core 151b which will be described later.

First, among the movable sections, the arrangement of the bearing section 120 that rotatably supports the movable section with the center line of the shaft 121 as a rotation axis will be described in detail hereinbelow by reference to FIG. 10. Two sets of a plurality of balls 122 and an outer ring 123 are respectively secured to approximately the center of the shaft 121 and the upper portion thereof. The balls 122 are placed between the outer surface of the shaft 121 and the inner surface of the outer ring 123, and thus permitted to rotate freely. A rotary cylinder 124 made of a magnetic material is fixed to the outer walls of a pair of the upper and lower outer rings 123. The rotary cylinder 124 has a shape whose diameter successively increases downwards in the three steps of small, intermediate and large, and its height approximately equals the height of the upper drum 101, which is described hereinbelow.

The upper drum section 100 is constituted of the upper drum 101. A flange section 101a is formed on the inner wall of the upper drum 101 so that it fits to the intermediate diameter section of the rotary cylinder 124. The inner wall and the bottom wall of the flange section 101a adhere to the rotary cylinder 124, and are fixed thereto. The upper drum 101 is provided with a U-shaped cut-out at the bottom section thereof, i.e., at the installation section for the magnetic head 140 so as to allow for the upward and downward motions of the magnetic head 140.

Moreover, the motor section 110, which is installed on the upper portion of the flange section 101a, is constituted of an armature section 110a fixed to the shaft 121 and a rotatable magnetic field generating section 110b. In the armature section 110a, a flange-shaped support member 112 is fitted to the upper end of the shaft 121, and a stator disc 111 is further fitted to the support member 112. A plurality of driving coils 115 are secured to and suspended from the bottom surface of the stator disc 111 in its mid-radial position along the circle.

The magnetic field generating section 110b is constituted of field magnets 113 and a support member 114. The support member 114 has an circumferential wall standing upright in parallel with the shaft 121. A plurality of field magnets 113 are fixed inside the circumferential wall at positions corresponding to the respective driving coils 115. Here, the bottom section of the support member 114 is fixed to the upper surface of the flange section 101a; thus, when a driving current is supplied to the driving coil 115, the magnetic field generating section 110b is rotated together with the rotary cylinder 124 and the upper drum 101.

The following is the last description of the arrangement of this embodiment, which discusses the head displacement adjusting mechanism 130. The function of the head displacement adjusting mechanism 130 is to shift the magnetic head 140 in the direction perpendicular to the rotation plane of the magnetic head 140, that is, in either extended direction of the shaft 121 in order to permit the magnetic head 140 to follow track vacillation in the magnetic tape during reproduction.

The central portion of the head displacement adjusting mechanism 130 is located between the central cylinder section 152a and the outer cylinder section 152b in the lower drum 152. The magnetic head 140 is located at a space formed between the bottom edge of the upper drum 101 and the upper edge of the outer cylinder section 152b. In the present embodiment, one magnetic head 140 is illustrated in the drawings; yet, two magnetic heads may be provided symmetrically with respect to the axis; or a plurality of magnetic heads may be provided. Additionally, the head displacement adjusting mechanism 130 is installed at the lower section of the rotary cylinder 124, and thus rotated together with the rotary cylinder 124.

Figure 16:
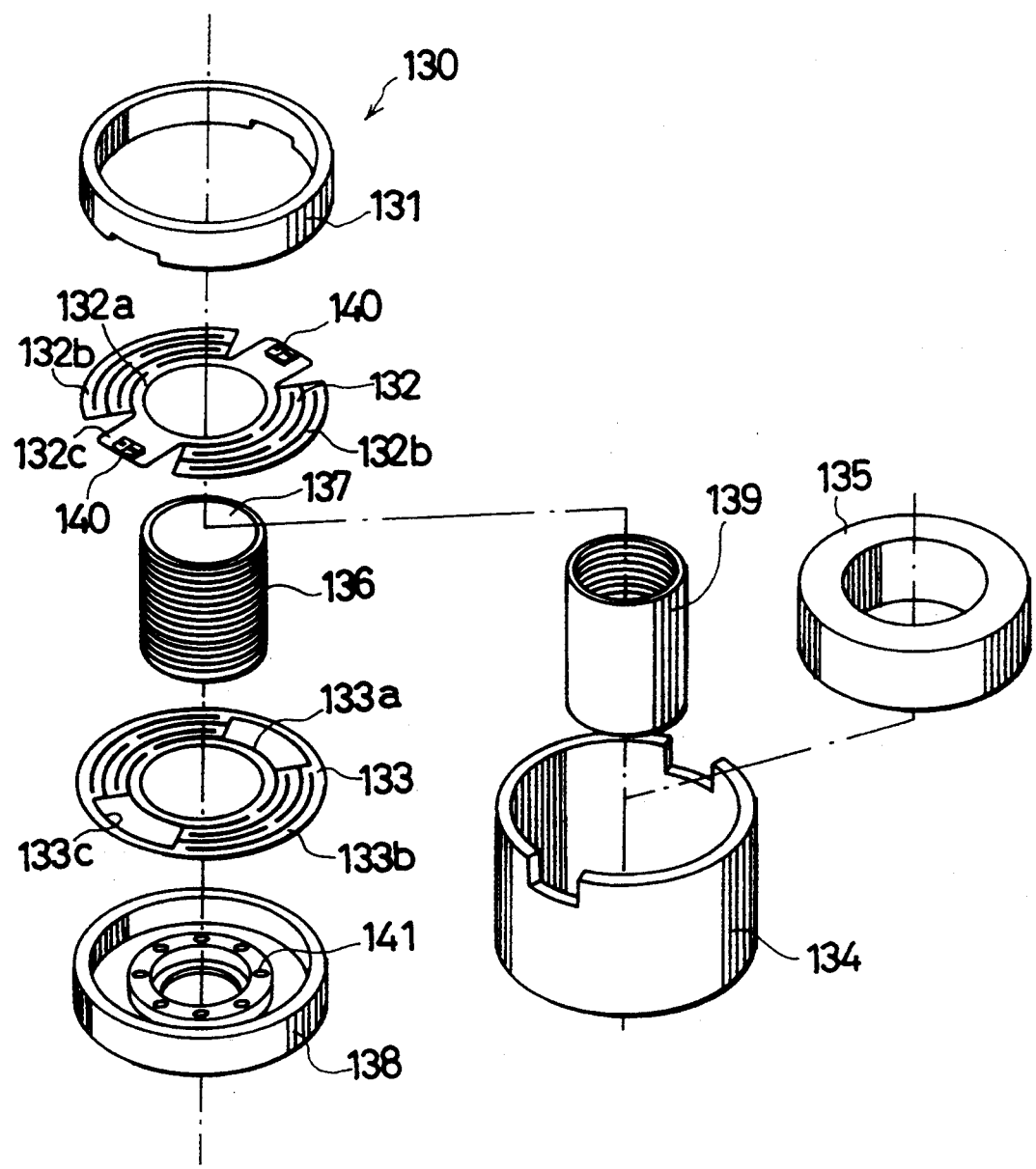
FIG. 16 is an exploded perspective view showing the assembly of the head displacement adjusting mechanism that is to be installed in the rotary-magnetic-head dynamic track following device of FIG. 10.
Figure 17A:
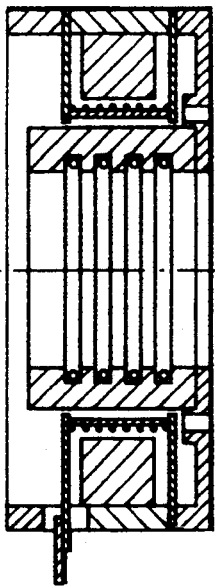
FIGS. 17(a) through 17(e) are vertical sectional views, each partially showing a main structure of the rotary-magnetic-head dynamic track following device of FIG. 10.
Figure 17B:
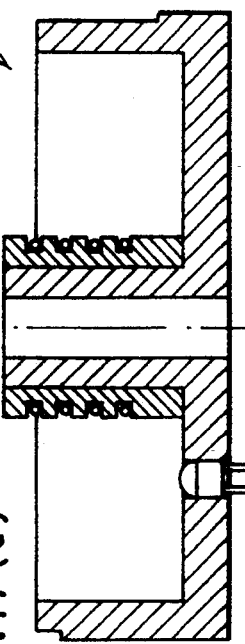
Figure 17C:
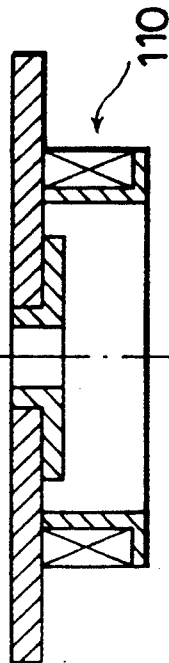
Figure 17D:
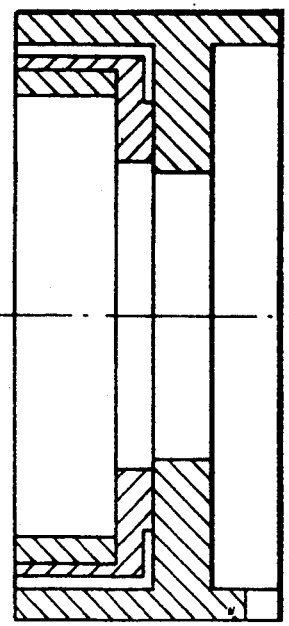
Figure 17E:
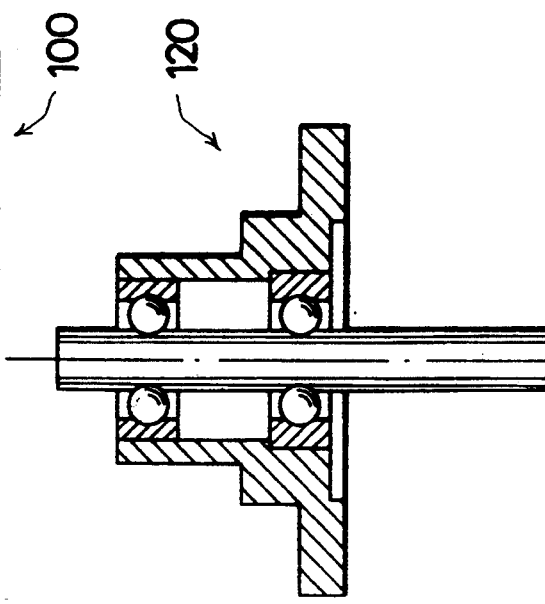

Referring to FIG. 16, the following description will discuss the structure and the assembly of the head displacement adjusting mechanism 130 more specifically. The lower ring-shaped yoke 138 forms a base of the head displacement adjusting mechanism 130. A plurality of penetrations 141 are formed in the lower ring-shaped yoke 138, and aligned around the center at equal intervals so as to form a ring-shape. The distance between the centers of the penetrations 141 and the shaft 121 coincides with the distance between the centers of the sensor 153 and the shaft 121.

A ring-shaped lower support spring 133 is securely fixed to the lower ring-shaped yoke 138. An insulator cylinder 137 provided with a coil 136 is fixed on the inner section 133a of the lower support spring 133. Further, a central ring-shaped yoke 134, together with the lower ring-shaped yoke 138, is securely fixed thereto so as to support the circumferential edge 133b of the lower support spring 133 in between. Here, a ring-shaped permanent magnet 135 is fixed to the inner wall of the central ring-shaped yoke 134 at its mid-level. The cross section of the permanent magnet 135 virtually shows a square at one side thereof.

Further, the inner section 132a of a ring-shaped upper support spring 132 is fixed to the upper end of the insulator cylinder 137. Here, the inner sections 132a and 133a can freely move upward and downward in cooperation with each other through the insulator cylinder 137. Moreover, an upper ring-shaped yoke 131, together with the central ring-shaped yoke 134, is securely fixed thereto so as to support the circumferential edge 132b of the upper support spring 132 in between. The upper portion of the inner wall of the upper ring-shaped yoke 131 is fixed to the outer edge of the bottom surface of the rotary cylinder 124. Thus, the lower ring-shaped yoke 138, the central ring-shaped yoke 134, the upper ring-shaped yoke 131, the bottom surface of the rotary cylinder 124 and the rotor transformer core 151b constitute a closed-loop magnetic circuit of the head displacement adjusting mechanism 130.

Additionally, for convenience in assembly, the rotor transformer core 151b may be fixed to the central portion of the lower ring-shaped yoke 138 before the installation of the upper support spring 132. The upper end of the rotor transformer core 151b is also fixed to the bottom surface of the rotary cylinder 124. The rotor transformer core 151b is provided with a rotor coil that is connected to the magnetic head 140, and the stator coil and the rotor coil are aligned face to face with each other with a slight space in between. Here, in each of the stator coil and the rotor coil, a coil for use in transmitting recording and reproducing signals and that for use in transmitting a controlling signal for shifting the magnetic head 140, which will be described later, are independently installed.

Here, in the circumference of the upper support spring 132, sections to which the magnetic heads 140 are adhered are referred to as head sections 132c. A deep notch reaching the inner edge 132a is formed between the head section 132c and the circumferential edge 132b. This arrangement allows the magnetic head 140 to easily move upward and downward in parallel to the rotation plane. Further, for the same reason, cut-out sections 133c are provided in the lower support spring 133 at locations corresponding to the head sections 132c. Furthermore, U-shaped cut-out sections are respectively provided in the upper end of the central ring-shaped yoke 134 and the lower end of the upper ring-shaped yoke 131. The U-shaped cut-out sections form window sections for accepting the head sections 132c.

In the above arrangement, an explanation will be given on the above-mentioned head moving mechanism 200. When a driving current is supplied to the driving coil 115 of the motor section 110, the magnetic field generating section 110b is rotated together with the upper drum 101 by the interaction between the driving current and the magnetic field of the field magnet 113. As a result, the rotary cylinder 124 coupled to the upper drum 101 is smoothly rotated through the free rotation of the balls 122 around the center of the shaft 121 as a rotation axis. As the rotary cylinder 124 rotates, the head displacement adjusting mechanism 130 is rotated together as one unit.

When the head displacement adjusting mechanism 130 rotates, a plurality of the penetrations 141 pass above the sensor 153. When the penetrations 141 pass above the sensor 153, the sensor 153 detects reflected light from the lower support spring 133 that has a higher reflectivity than the lower ring-shaped yoke 138, and releases pulses. The dc-voltage value of these pulses varies in accordance with the distance between the lower support spring 133 and the sensor 153. Therefore, based on the dc-voltage value, the level of the lower support spring 133 with respect to the reference plane A (indicated in FIG. 10) can be detected. Based on this detected value and information of the relative position with respect to the recording tracks on the magnetic tape, which is detected by the magnetic head 140, a controlling current to be supplied to the head displacement adjusting mechanism 130 is generated.

The controlling current is supplied to the coil 136 after having been sent to the stator coil of the stator transformer core 151a and the rotor coil of the rotor transformer core 151b. Therefore, by the interaction exerted between the controlling current flowing through the coil 136 and the magnetic flux of the permanent magnet 135, the insulator cylinder 137 having the coil 136 is subjected to a force exerted in either extended direction of the shaft 121. The upper support spring 132 and the lower support spring 133 are elastically distorted in the direction of the force imposed on the insulator cylinder 137; therefore, the insulator cylinder 137 and the magnetic head 140 are displaced in either extended direction of the shaft 121 to a position at which the force imposed on the insulator cylinder 137 balances the elastic forces of the upper support spring 132 and the lower support spring 133.

In this way, the magnetic head 140 is permitted to have a desired amount of displacement, and is able to follow track vacillation on the recorded magnetic tape, thereby making it possible to provide an accurate tracking.

A reproduced signal released from the magnetic head 140 is sent to an amplifier and other devices, after having been sent to the rotor coil of the rotor transformer core 151b and the stator coil of the stator transformer core 151a. On the other hand, a recording signal is supplied to the magnetic head 140 through the stator coil and the rotor coil in the reverse manner to reproduction.

Figure 14A:
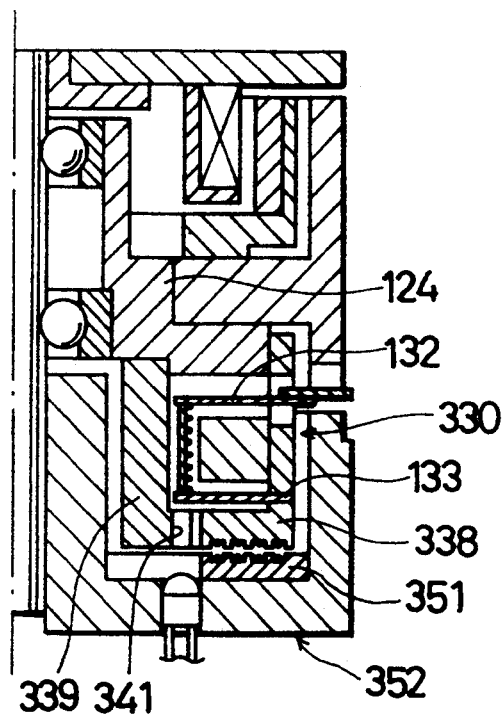
FIGS. 14(a) and 14(b) are vertical sectional views of a modified example of a rotary transformer, shown on the right side with respect to the symmetry axis, that is to be installed in the rotary-magnetic-head dynamic track following device of FIG. 10.

Additionally, instead of the cylinder-shaped rotary transformer as disclosed in the third embodiment, a plate-shaped rotary transformer may be installed as is illustrated in FIG. 14(a). In order to adopt this arrangement, a slight alternation is required in mounting a head displacement adjusting mechanism 330 on the lower drum section.

More specifically, on the inside of the bottom surface of a lower drum 352, an annular-ring plate-shaped stator transformer core 351 is disposed outside from the station at which a sensor 353 is buried, and a stator coil is fixed to the plate-shaped stator transformer core 351. A rotor coil is fixed to the bottom surface of a plate-shaped rotor transformer core 338 in such a manner that it is aligned face to face with the stator coil with a slight space in between. The plate-shaped rotor transformer core 338 is L-shaped in the sectional view on one side, and coupled to the bottom section of the rotary cylinder 124 through a cylinder 339 made up of a magnetic material.

With this arrangement, the rotary cylinder 124 and the plate-shaped rotor transformer core 338 function as the yoke of the head displacement adjusting mechanism 330.

Here, a raised edge is formed with a slight height along the circumference of the upper surface of the plate-shaped rotor transformer core 338 so as to hold the lower support spring 133. On a flange section formed on the lower end of the cylinder 339 are formed penetrations 341 that correspond to a plurality of the aforementioned penetrations 141.

Figure 14B:
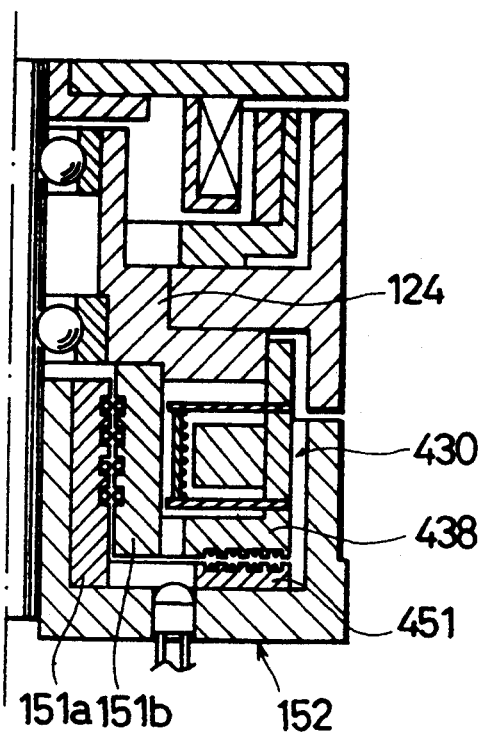

Further, as illustrated in FIG. 14(b), a combined structure may be adopted between a cylinder-shaped rotary transformer, which is constituted of the stator transformer core 151a and the rotor transformer core 151b of the third embodiment, and a plate-shaped rotary transformer, which is constituted of the plate-shaped rotor transformer core 438 and the plate-shaped stator transformer core 451. Here, the plate-shaped rotor transformer core 438 and the plate-shaped stator transformer core 451 respectively correspond to the aforementioned rotor transformer core 338 and the stator transformer core 351.

In this case, the rotor transformer core 151b, the plate-shaped rotor transformer core 438 and the rotary cylinder 124 function as a yoke of a head displacement adjusting mechanism 430 that corresponds to the aforementioned head displacement adjusting mechanism 130.

In the case of installing the cylinder-shaped rotary transformer and the plate-shaped rotary transformer as described above, one of them may be used for transmitting recording and reproducing signals and the other may be used for transmitting a controlling signal. Further, in each of the rotary transformers, a coil for transmitting recording and reproducing signals and that for transmitting a controlling signal may be independently installed.

Figure 15A:
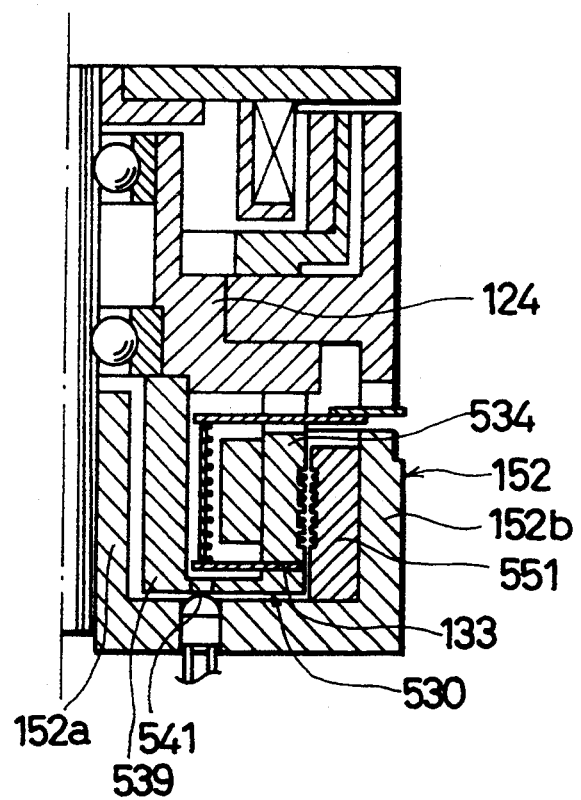
FIGS. 15(a) and 15(b) are vertical sectional views of another modified example of a rotary transformer, shown on the right side with respect to the symmetry axis, that is to be installed in the rotary-magnetic-head dynamic track following device of FIG. 10.

As illustrated in FIG. 15(a), a stator transformer core 551 may be securely fixed to the inner wall of the outer cylinder section 152b instead of fitting it to the central cylinder section 152a of the lower drum 152. In this case, the central ring-shaped yoke 134 of the third embodiment is replaced by a rotary transformer core 534 that faces the stator transformer core 551.

Here, instead of the rotary transformer core 151b and the lower ring-shaped yoke 138 of the third embodiment, a cylinder 539 made of a magnetic material is fixed to the bottom section of the rotary cylinder 124. On a flange section formed along the lower end of the cylinder 539, are formed a raised section for holding the lower support spring 133 and penetrations 541 that correspond to a plurality of the aforementioned penetrations 141.

In this case, the rotary cylinder 124 and the rotor transformer core 534 function as a yoke of a head displacement adjusting mechanism 530 that corresponds to the aforementioned head displacement adjusting mechanism 130.

Figure 15B:
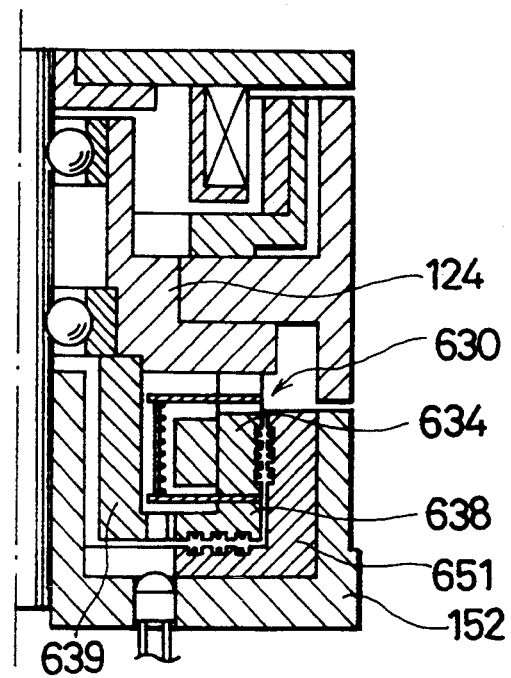

Moreover, as illustrated in FIG. 15(b), a combined structure may be adopted between the plate-shaped rotary transformer of FIG. 14(a) and the cylinder-shaped rotary transformer of FIG. 15(a). In this case, a stator transformer core 651 to be fixed to the inside of the bottom surface and the inside wall of the lower drum 152 may have a structure wherein the plate-shaped stator transformer core 351 and the stator transformer core 551 are integrally formed into one unit, or a structure wherein they are separately installed and coupled to each other.

Here, the rotary cylinder 124, a rotor transformer core 634 corresponding to the rotor transformer core 534, a plate-shaped rotor transformer core 638 corresponding to the plate-shaped rotor transformer core 338, and a cylinder 639 corresponding to the cylinder 339, function as a yoke of a head displacement adjusting mechanism 630 that corresponds to the aforementioned head displacement adjusting mechanism 130.

In this embodiment, the head displacement adjusting mechanism 130, the upper drum 101, and the rotor transformer core 151b are fixed to the rotary cylinder 124, and the magnetic field generating section 110b in the motor section 110 is coupled to the rotary cylinder 124 through the upper drum 101. Further, an integrated structure is achieved in such a manner that the rotor transformer core 151b serves as both of the rotary transformer and a part of the magnetic circuit of the head displacement adjusting mechanism 130 and that the rotary cylinder 124 functions as a part of the above magnetic circuit. As a result, the motor section 110, the head displacement adjusting mechanism 130, and the rotary transformer can be completely housed inside the upper drum section 101 and the lower drum section 152; thereby making the rotary-magnetic-head dynamic track following device 200 compact.

Fourth Embodiment

Figure 11:
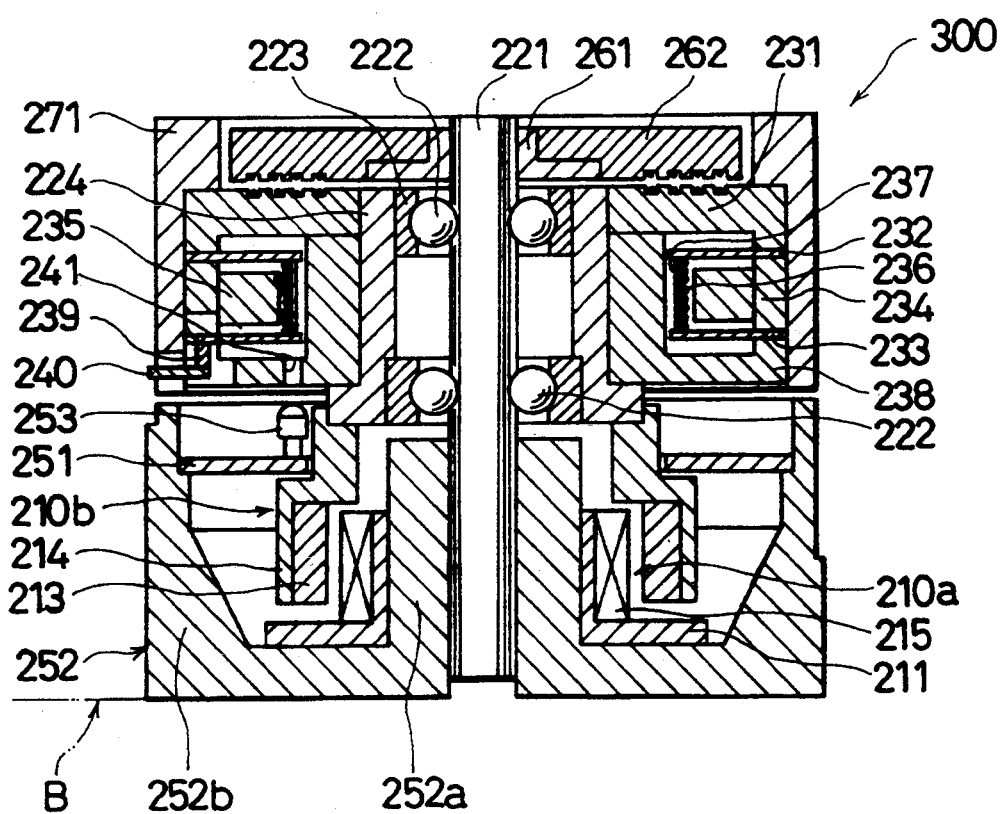
FIG. 11 is a vertical sectional view showing still another structural example of the rotary-magnetic-head dynamic track following device of the present invention.
Figure 13:
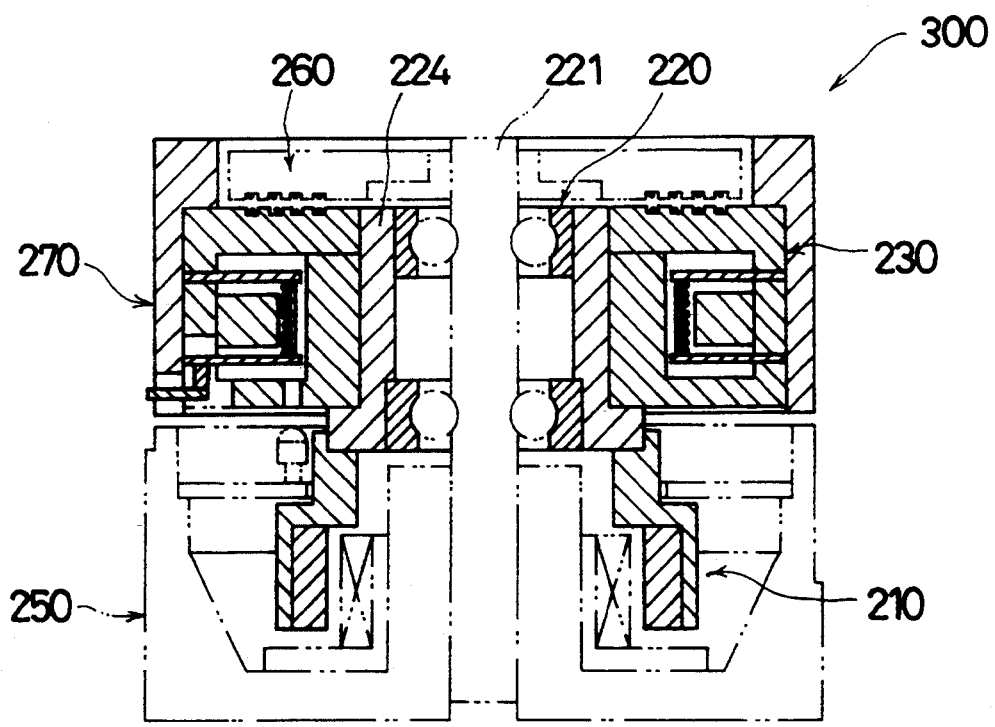
FIG. 13 is a vertical sectional view showing movable sections of the rotary-magnetic-head dynamic track following device of FIG. 11.

Referring to FIGS. 11 and 13, the following description will discuss still another embodiment of the present invention.

As illustrated in FIG. 13, a rotary-magnetic-head dynamic track following device 300 of FIG. 11 is mainly constituted of a motor section 210, a bearing section 220, a head displacement adjusting mechanism 230, a lower drum section 250, a rotary transformer section 260, and an upper drum section 270. Here, solid lines of FIG. 13 illustrate the movable sections having the center line of a shaft 221 as a rotation axis, which will be described later.

In the rotary-magnetic-head dynamic track following device 200 of the third embodiment, the motor section 110 is disposed on the upper side and the head displacement adjusting mechanism 130 is disposed on the lower side with respect to the rotary cylinder 124 of the bearing section 120; yet, in a rotary-magnetic-head dynamic track following device 300 of the present embodiment, the motor section 210 is disposed on the lower side and the head displacement adjusting mechanism 230 is disposed on the upper side with respect to the rotary cylinder 224 of the bearing section 220, which is a reverse manner to the third embodiment.

First, the lower drum section 250 is a fixed section that serves as a supporting base of the rotary-magnetic-head dynamic track following device 300, and is provided with a lower drum 252, a sensor 253, and a ring-shaped sensor support plate 251 as shown in FIG. 11. On the lower drum 252 are formed a central cylinder section 252a having a shaft 221 inserted upright in the center thereof and an outer cylinder section 252b having a face to be in contact with a magnetic tape. The circumferential section of the sensor support plate 251 is fixed to the upper section of the outer cylinder section 252b. Since the head displacement adjusting mechanism 230 is housed inside the upper drum section 270, the sensor 253 is secured in the vicinity of an inner hole of the sensor support plate 251, and thus detects the absolute level of the lower support spring 233 with respect to the reference plane B.

Next, an explanation will be given of the arrangement of the bearing section 220. As for the arrangement having a plurality of balls 222 and outer rings 223 provided to a shaft 221, the bearing section 220 has the same arrangement as that of the third embodiment. A rotary cylinder 224 having a flange section provided on the lower end is fixed to the outer walls of a pair of the upper and lower outer rings 223. The level of the rotary cylinder 224 is virtually equal to that of the upper drum 271.

The upper drum section 270 is constituted of an upper drum 271 with which the magnetic tape comes into contact. The upper drum 271 completely houses a rotary transformer section 260 in addition to the head displacement adjusting mechanism 230. Further, U-shaped cut-outs are formed on the bottom edge of the upper drum 271, providing installation sections for the magnetic head 240 to allow for the upward and downward motions of the magnetic head 240.

The motor section 210, which is installed inside the lower drum 252, is constituted of an armature section 210a fixed to the lower drum 252 and a rotatable magnetic field generating section 210b. In armature section 210a, a flange-shaped stator 211 is fitted to the bottom circumferential edge of the central cylinder section 252a, and a plurality of driving coils 215 are securely fixed to the periphery of the cylinder section of the stator 211.

The magnetic field generating section 210b is constituted of a field magnet 213 and a support cylinder 214. The support cylinder 214 is provided with a step in the middle level thereof, and its upper end is fixed to the bottom circumferential edge of the rotary cylinder 224. In this arrangement, the field magnet 213, which is securely fixed to the lower section of the inner wall of the support cylinder 214, is suspended into the lower drum 252 through the inner hole of the sensor support plate 251, and aligned face to face with the driving coils 215. When a driving current is supplied to the driving coils 215, the magnetic field generating section 210b rotates together with the rotary cylinder 224 and the upper drum 271, as one unit.

The rotary transformer section 260 is installed on the upper end of the shaft 221 to form a plate-shaped rotary transformer. A flange-shaped fixing plate 261 is fitted to the upper end of the shaft 221, and a stator transformer core 262 is fitted to the fixing plate 261. The stator transformer core 262 faces a rotor transformer core 231, which will be described later, with a slight space in between.

The following is the last description of the arrangement of this embodiment, which discusses the head displacement adjusting mechanism 230. The function of the head displacement adjusting mechanism 230 is to shift the magnetic head 240 in the direction perpendicular to the rotation plane of the magnetic head 240, that is, in either extended direction of the shaft 221 in order to permit the magnetic head 240 to follow track vacillation in the magnetic tape during reproduction. The head displacement adjusting mechanism 230 is integrally supported between the rotary cylinder 224 and the upper drum 271 in such a manner that the magnetic head 240 is located in a space that is formed between the bottom edge of the upper drum 271 and the upper edge of the outer cylinder section 252b. Thus, the head displacement adjusting mechanism 230 is permitted to rotate together with the rotary cylinder 224 and the upper drum 271 as one unit by the rotation of the motor section 210.

The following description will discuss the structure and the assembly of the head displacement adjusting mechanism 230 more specifically. A flange-shaped yoke 238, which forms a base of the head displacement adjusting mechanism 230, is fixed to the flange-shaped section of the rotary cylinder 224. The flange-shaped yoke 238 virtually has a L-shape in its cross-section on one side, and a plurality of penetrations 241 are formed in the bottom section thereof in a ring-shaped array with equal intervals. The distance between the centers of the penetrations 241 and the center of the shaft 221 coincides with the distance between the centers of the sensor 253 and the shaft 221.

A raised section is formed on the bottom circumferential edge of the flange-shaped yoke 238 with a slight height, and used to hold a ring-shaped support spring 233. A central ring-shaped yoke 234 is fixed on the raised section with the lower support spring 233 being sandwiched and supported in between. A insulator cylinder 237 is fixed on the inner edge of the lower support spring 233, and a coil 236 is provided on the insulator cylinder 237. Here, a ring-shaped permanent magnet 235 is fixed to the inner wall of the central ring-shaped yoke 234 at its mid-level. The cross section of the permanent magnet 235 virtually shows a square at one side thereof.

Further, the inner edge of the ring-shaped upper support spring 232 is fixed to the upper end of the insulator cylinder 237. Moreover, the rotor transformer core 231, together with the central ring-shaped yoke 234, is securely fixed thereto so as to support the circumferential edge of the upper support spring 232 in between. Here, the rotor transformer core 231 is fixed to the upper outer wall of the rotary cylinder 224 and to the upper cylinder end of the flange-shaped yoke 238.

In this arrangement, a head support member 239 is suspended at the outside of the circumference of the lower support spring 233, and the magnetic head 240 is fixed to the lower end of the head support member 239. The detailed structure of the lower support spring 233 is the same as that of the aforementioned upper support spring 132, and the detailed structure of the upper support spring 232 is the same as that of the aforementioned lower support spring 133. With this arrangement, the magnetic head 240 is permitted to move upward and downward in parallel to its rotation plane. In addition, cut-out sections are respectively formed in the lower end of the central ring-shaped yoke 234 and in the flange section of the flange-shaped yoke 238 so as to provide an installation station for the head support member 239.

In this arrangement, as with the third embodiment, the absolute level of the lower support spring 233 with respect to the reference plane B is detected in accordance with the output of the sensor 253. Based on this detected value and information of the relative position with respect to the recording tracks on the magnetic tape, which is detected by the magnetic head 240, a controlling current to be supplied to the head displacement adjusting mechanism 230 is generated. The controlling current is supplied to the coil 236 after having been sent to the stator coil of the stator transformer core 262 and to the rotor coil of the rotor transformer core 231. As to the action of the insulator cylinder 237 and the magnetic head 240 that are moved in either extended direction of the shaft 221, it is performed as described earlier.

In this embodiment, the head displacement adjusting mechanism 230 and the magnetic field generating section 210b of the motor section 210 are fixed to the rotary cylinder 224, and the upper drum 271 is coupled to the rotary cylinder 224 through the head displacement adjusting mechanism 230. Further, the rotor transformer core 231 is designed in an integrated manner so that it functions as both of the rotary transformer and a part of the magnetic circuit of the head displacement adjusting mechanism 230. As a result, the motor section 210, the head displacement adjusting mechanism 230, and the rotary transformer section 260 can be completely housed inside the upper drum section 271 and the lower drum section 252, thereby making the rotary-magnetic-head dynamic track following device 300 compact.

Fifth Embodiment

Figure 18:
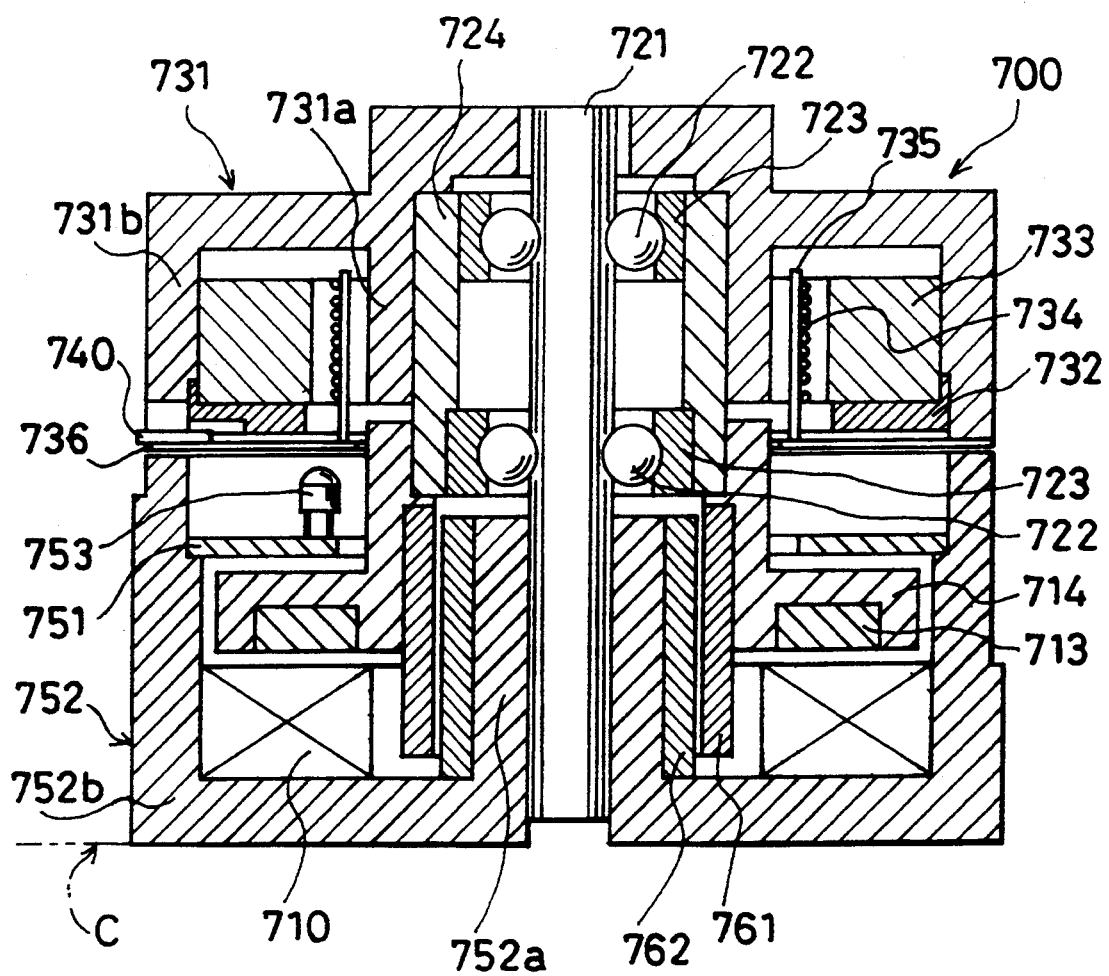
FIG. 18 is a vertical sectional view showing still another structural example of the rotary-magnetic-head dynamic track following device of the present invention.
Figure 19:
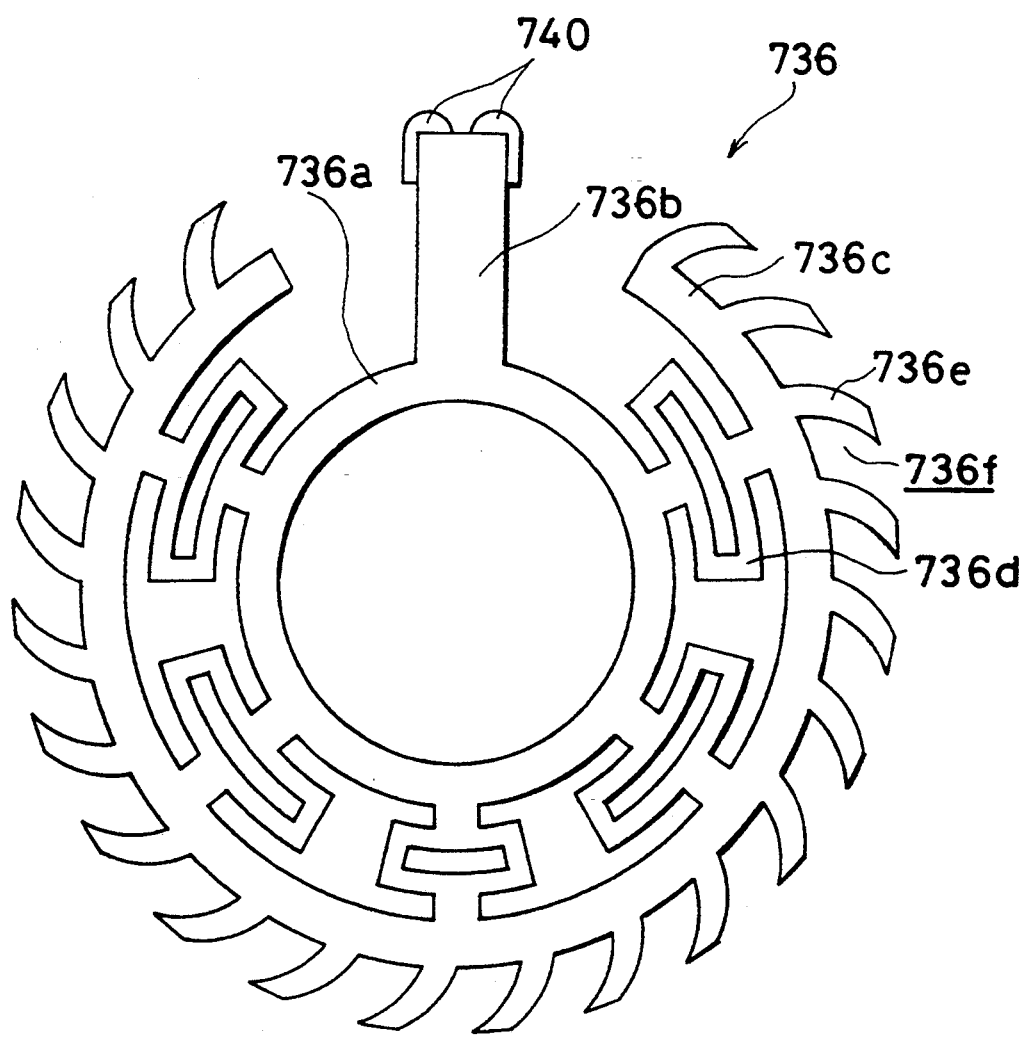
FIG. 19 is a plan view showing the structure of a head support member that is to be installed in the rotary-magnetic-head dynamic track following device of FIG. 18.
Figure 20:
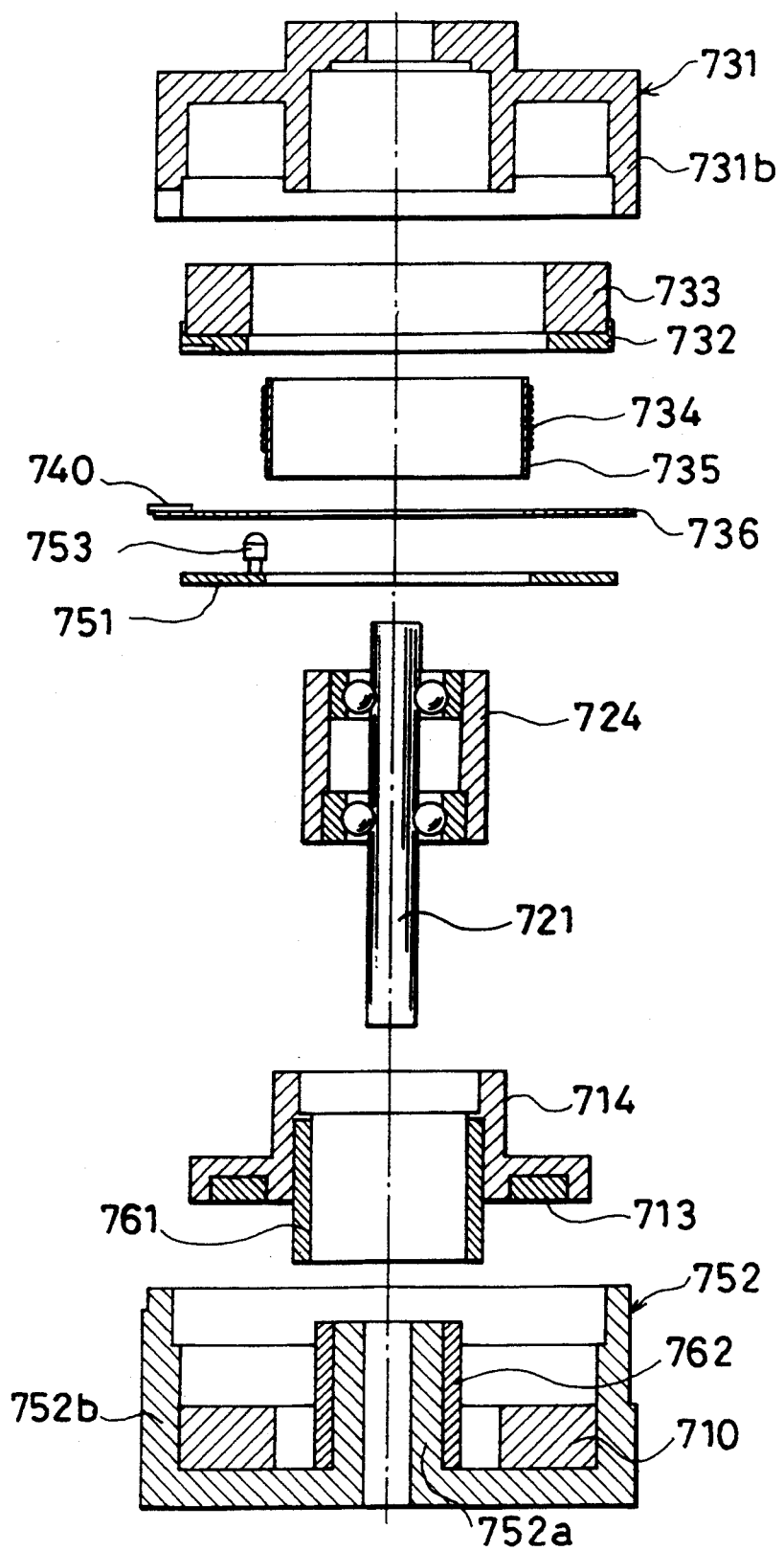
FIG. 20 is an exploded vertical sectional view schematically showing the assemble of the rotary-magnetic-head dynamic track following device of FIG. 18.

Referring to FIG. 18 through FIG. 20, the following description will discuss still another embodiment of the present invention.

As illustrated in FIG. 18, a rotary-magnetic-head dynamic track following device 700 is mainly constituted of a motor section, a bearing section, a head displacement adjusting mechanism, and a lower drum section, and a rotary transformer section. The following is a detailed description of each of those sections.

First, the lower drum section is a fixed section that serves as a supporting base of the rotary-magnetic-head dynamic track following device 700, and is provided with a lower drum 752, a sensor 753, and a ring-shaped sensor support plate 751. A central cylinder section 752a having a shaft 721 inserted upright in the center thereof and an outer cylinder section 752b having a face to come into contact with a magnetic tape are installed in an upright manner with respect to the bottom surface of the lower drum 752. The circumferential edge of the sensor support plate 751 is fixed to the upper section of the outer cylinder section 752b. The sensor 753 is installed in the vicinity of the inner hole of the sensor support plate 751 in such a manner that it detects the absolute level of a head support member 736 (to be described later) with respect to the reference plane C.

Next, the arrangement of the bearing section will be described hereinbelow. The bearing section freely rotatably supports a movable section that is constituted of the head displacement adjusting mechanism and the upper drum section and other members, having the center line of the shaft 721 as a rotation axis. Two sets of a plurality of balls 722 and an outer ring 723 are respectively secured to approximately the center of the shaft 721 and the upper portion thereof. The balls 722 are placed between the outer surface of the shaft 721 and the inner surface of the outer ring 723, and thus permitted to rotate freely. A rotary cylinder 724 is fixed to the outer walls of a pair of the upper and lower outer rings 723.

The motor section, which is installed in the lower drum 752, is constituted of an armature 710 fixed to the lower drum 752 and a rotatable magnetic field generating section. The magnetic field generating section is constituted of a field magnet 713 and a support cylinder 714. The upper end of the support cylinder 714 is fixed to the circumference of the bottom of the rotary cylinder 724, and the field magnet 713 is securely fixed to the lower flange section of the support cylinder 714. Thus, the field magnet 713 is suspended into the lower drum 752 through the inner hole of the sensor support plate 751, and arranged to face the armature 710. When a driving current is supplied to the armature 710, the magnetic field generating section is rotated together with the head displacement adjusting mechanism and the upper drum section, as one unit, through the rotary cylinder 724 and the bearing section.

The rotary transformer section is disposed around the central cylinder section 752a of the lower drum 752, and provided as a cylinder-shaped rotary transformer. The rotor transformer 761 is fixed to the inner wall of the support cylinder 714. Further, the stator transformer 762 is fixed to the circumferential wall of the central cylinder section 752a, and arranged to face the rotor transformer 761 with a slight space in between.

The following description will discuss the head displacement adjusting mechanism in detail. The function of the head displacement adjusting mechanism is to shift the magnetic head 740 in the direction perpendicular to the rotation plane of the magnetic head 740, that is, in either extended direction of the shaft 721 in order to permit the magnetic head 740 to follow track vacillation in the magnetic tape during reproduction.

The head displacement adjusting mechanism is provided with a magnet 733, an upper yoke 731, a lower yoke 732, a cylinder bobbin 735, a coil 734 wound around the bobbin 735, and the head support member 736.

The upper yoke 731 and the lower yoke 732 are made of a magnetic material, and disposed in such a manner that the magnetic flux exerted by the magnet 733 form a closed loop. The upper yoke 731, which corresponds to a so-called rotary drum, is provided with a ring-shaped groove that has an opening downward. That is, the groove are surrounded by the ceiling, the inner wall 731a, and the circumferential wall 731b of the upper yoke 731.

The magnet 733 is securely fixed to the inner face of the circumferential wall 731b, and magnetized in parallel to the radial direction of the rotation of the magnetic head 740. The coil 734 and the bobbin 735 are inserted between the magnet 733 and the inner wall 731a. The lower yoke 732, which virtually has a disc-shape with an inner hole, is fixed to the bottom face of the magnet 733 and the lower section of the inner face of the circumferential wall 731b around the bottom section of the bobbin 735.

The circumferential face of the upper yoke 731, which serves as a tape-contact face, is coated with a friction-resisting material after having been smoothly finished, so as not to cause damage to the tape in travel. Further, U-shaped cut-outs are respectively formed in the upper yoke 731 and the lower yoke 732, providing installation sections for the magnetic head 740 to allow for the upward and downward motions of the magnetic head 740.

Next, referring to FIG. 19, one embodiment of the head support member 736 will be discussed hereinbelow. The head support member 736 is constituted of an inner ring section 736a, a head fixing section 736b sticking out from the inner ring section 736a in the radial direction, an outer ring section 736c formed as a partial circle with cut-out portions in the vicinity of the head fixing section 736b, and a plurality of bridge sections 736d partially connecting the outer ring section 736c and the inner ring section 736a. Further, a plurality of sticking-out portions 736e are provided to the outer ring section 736c, extending out in the helical direction from the center of the head support member 736.

The inner ring section 736a is fixed to the lower end of the bobbin 735 to form a connecting section whereon the bobbin 735 is installed. Further, a plurality of the sticking-out portions 736e are fixed to the bottom face of the circumferential wall 731b of the upper yoke 731, and arranged to face the upper face of the outer cylinder section 752b of the lower drum 752 with a slight space in between. The magnetic head 740 is secured to the free end of the head fixing section 736b. Thus, the magnetic head 740 is located in the space between the circumferential wall 731b of the upper yoke 731 and the outer cylinder section 752b of the lower drum 752 in such a manner that it sticks out slightly from the cut-out section of the upper yoke 731.

Referring to FIG. 20, the following description will discuss the assembly of the rotary-magnetic-head dynamic track following device 700 having the above-mentioned structure, in sequence.

(1) The field magnet 713 and the rotary transformer 761 are fixed to the support cylinder 714.

(2) The lower section of the rotary cylinder 724 is fitted to the upper section of the support cylinder 714.

(3) The armature 710 is installed inside the lower drum 752, and the stator transformer 762 is fixed to the central cylinder section 752a of the lower drum 752.

(4) The shaft 721 is inserted into and fixed to the central cylinder section 752a. In this case, the distance and the angle of insertion are accurately adjusted in order to form a predetermined space between the field magnet 713 and the armature 710 and provide a best-suited relationship between the space and height of the rotor transformer 761 and the stator transformer 762.

(5) The sensor support plate 751 provided with the sensor 753 is fixed to a predetermined location of the lower drum 752.

(6) The lower yoke 732, whereto the magnet 733 is securely fixed, is fixed to the upper yoke 731.

(7) The bobbin 735 provided with the coil 734 and the magnetic head 740 are accurately fixed to the head support member 736.

(8) The outer edge of the head support member 736 is securely fixed to the bottom face of the circumferential wall 731b of the upper yoke 731. This installation is accurately adjusted so that the rotation center of the upper yoke 731 coincides with the rotation center of the head support member 736.

(9) Lastly, the rotary cylinder 724 is fitted inside the inner wall 731a of the upper yoke 731, thereby completing the assembly of the rotary-magnetic-head dynamic track following device 700.

In the above arrangement, an explanation will be given on the operation of the head displacement adjusting mechanism. When a driving current is supplied to the armature 710, the motor section is rotated. Through the rotation of the motor section, the rotary cylinder 724, the upper yoke 731, the lower yoke 732, and the head displacement adjusting mechanism are all rotated as one unit.

When a controlling current is supplied to the coil 734 through the rotary transformer section, a controlling magnetic field which varies in its direction and magnitude in response to the direction and magnitude of the controlling current is exerted. In response to an electromagnetic force caused by the interaction between the controlling magnetic field and the constant magnetic field of the magnet 733, the bobbin 735 is shifted upward or downward in either extended direction of the shaft 721. Thus, the magnetic head 740 is allowed to follow track vacillation in the magnetic tape.

Here, the controlling current is supplied to the coil 734 through the rotary transformer section; yet, another arrangement wherein the controlling current is supplied through a slip ring and a brush may be adopted.

In the case where the rotary drum and the yoke to cover the head displacement adjusting mechanism are separately installed, if provisions for compactness and light weight of the rotary-magnetic-head dynamic track following device were made, it would become difficult to provide enough space to install the head displacement adjusting mechanism. However, in accordance with the present invention, since the upper yoke 731 functions as a so-called rotary drum and a yoke, sufficient space is provided for installing the head displacement adjusting mechanism, and the magnet 733 that is large enough to generate a constant magnetic field with a sufficient intensity can be installed. As a result, without increasing the controlling current to be supplied to the coil 734, that is, without increasing electric power to be consumed in the rotary-magnetic-head dynamic track following device, the response characteristic of the head displacement adjusting mechanism can be enhanced.

Further, since the bobbin 735 is fixed to the head support member 736, it is shifted to a position at which the electromagnetic force balances the resiliency against the elastic deformation of the head support member 736. Here, a desired elasticity is imparted to the head support member 736 mainly by a plurality of the bridge sections 736d. These bridge sections 736d, which functions as springs, are arranged symmetrically and radially; this permits the magnetic head 740 to be shifted in either extended direction of the shaft 721 without causing distortion.

Moreover, since the upper yoke 731 has a relative speed with respect to the lower drum 752, the head support member 736 also functions as a spiral groove in such a manner that it generates a dynamic force to make the magnetic tape float slightly above the contact face of the upper yoke 731 or the lower drum 752. In this case, by fixing a plurality of sticking-out portions 736e extending out from the head support member 736 to the bottom face of the circumferential wall 731b of the upper yoke 731, the sticking-out portions 736e make lands, while gap portions 736f between the adjacent sticking-out portions 736e make grooves. Moreover, since the sticking-out portions 736e are installed so as to extend out in the helical directions from the center of the head support member 736, air is directed to flow out from the gap portions 736f along the sticking-out portions 736e by the rotation of the upper yoke 731. This arrangement provides a force to make the magnetic tape float above the contact face of the lower drum 752.

In addition, since the length of the sticking-out portions 736e is set to be longer than the width of the bottom face of the circumferential wall 731b, the spiral grooves with a sufficient length can be provided. Therefore, even if the thickness of the upper yoke 731, that is, the thickness of the circumferential wall 731b, is decreased in order to achieve compactness and light weight of the rotary-magnetic-head dynamic track following device 700, the function as the spiral grooves will not be reduced, thereby providing a sufficient dynamic force.

As a result, it becomes preventable to have occurrences of such phenomena as: adhesion of the magnetic tape and the contact face of the lower drum 752 due to dew drops; and self-excited vibration in the magnetic tape due to intermittent adhesion. Further, even if metal tapes are employed as magnetic tapes, the relative friction coefficient between the metal tape and the lower drum can be reduced, thereby making it possible to stabilize the travel of the magnetic tape.

Sixth Embodiment

Figure 21:
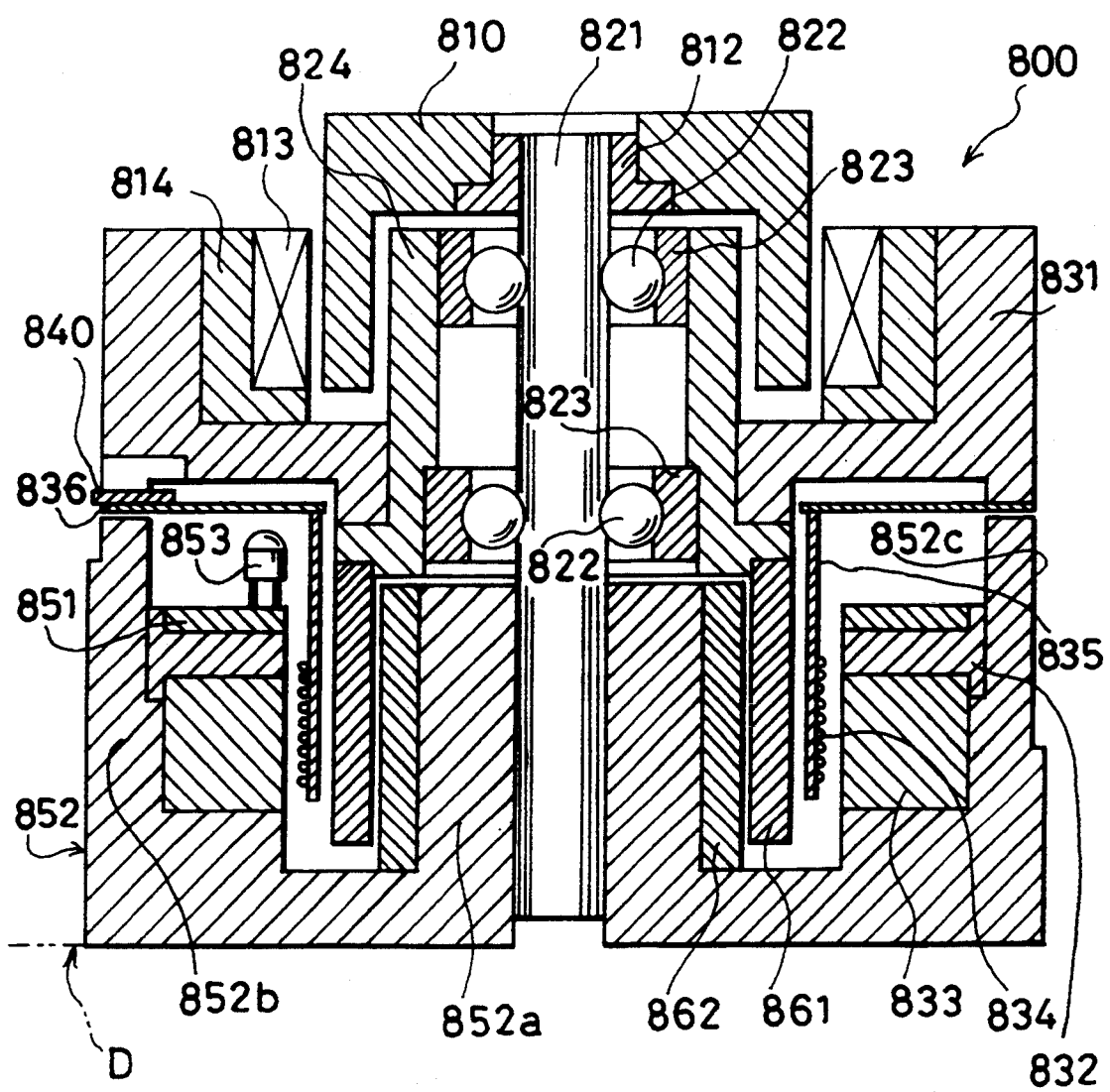
FIG. 21 is a vertical sectional view showing another structural example of the rotary-magnetic-head dynamic track following device of the present invention.

Referring to FIG. 21, the following description will discuss still another embodiment of the present invention.

A rotary-magnetic-head dynamic track following device 800 is mainly constituted of a motor section, a bearing section, a head displacement adjusting mechanism, a lower drum section, a rotary transformer section, and an upper drum section. The following is a detailed description of each of those sections.

First, the lower drum section, which is provided with a lower yoke drum 852 made of a magnetic material, a sensor 853, and a sensor support plate 851, functions as a fixed section that provides a supporting base for the rotary-magnetic-head dynamic track following device 800 and as part of the magnetic circuit of the head displacement adjusting mechanism. A central cylinder section 852a having a shaft 821 inserted upright in the center thereof and an outer cylinder section 852b having a face to come into contact with a magnetic tape are installed in an upright manner with respect to the lower drum 852. The outer circumferential section of the sensor support plate 851 is fixed to the upper portion of the outer cylinder section 852b. The sensor 853 is installed in the vicinity of the inner hole of the sensor support plate 851, and detects the absolute level of a head support member 836 (to be described later) with respect to the reference plane D.

Further, the outer circumferential face of the lower yoke drum 852 forms a tape-contact face 852c. The tape-contact face 852c is coated with a friction-resisting material after having been smoothly finished, so as not to cause damage to a traveling tape.

Next, the following description will discuss the arrangement of the bearing section. The bearing section rotatably supports a movable section with the center line of the shaft 821 as a rotation axis. The movable section is constituted of the motor section, the upper drum section, and part of the head displacement adjusting mechanism. Two sets of a plurality of balls 822 and an outer ring 823 are respectively secured to approximately the center of the shaft 821 and the upper portion thereof. The balls 822 are placed between the outer surface of the shaft 821 and the inner surface of the outer ring 823, and thus permitted to rotate freely. A rotary cylinder 824 is fixed to the outer walls of a pair of the upper and lower outer rings 823.

The motor section is constituted of an armature 810 that is suspended inside the upper drum 831 from the upper end of the shaft 821 and a rotatable magnetic field generating section that is fixed to the inner wall of the upper drum 831. The magnetic field generating section is constituted of a field magnet 813 and a support member 814 to which the field magnet 813 is secured. Here, a ring-shaped member 812 is fixed to the upper end of the shaft 821, and positioning of the armature 810 is made by the ring-shaped member 812 in such a manner that the armature 810 is aligned face to face with the field magnet 813 with a slight space in between.

In this arrangement, when a driving current is supplied to the armature 810, the magnetic field generating section rotates together with the upper drum 831, the rotary cylinder 824, and the head displacement adjusting mechanism, as one unit.

The upper drum section, which is constituted of the upper drum 831, is provided with a U-shaped cut-out at an installation section for the magnetic head 840 so as to allow for the upward and downward motions of the magnetic head 840.

The rotary transformer section is disposed around the central cylinder section 852a of the lower drum 852, and provided as a cylinder-shaped rotary transformer. The rotor transformer 861 is fixed to a flange section that is formed at the bottom portion of the rotary cylinder 824. Further, the stator transformer 862 is fixed to the circumferential wall of the central cylinder section 852a, and arranged to face the rotor transformer 861 with a slight space in between.

The following description will discuss the head displacement adjusting mechanism in detail. The function of the head displacement adjusting mechanism is to shift the magnetic head 840 in the direction perpendicular to the rotation plane of the magnetic head 840, that is, in either extended direction of the shaft 821 in order to permit the magnetic head 840 to follow track vacillation in the magnetic tape during reproduction.

The head displacement adjusting mechanism is provided with a magnet 833, an upper yoke 832 having a virtual ring shape, a cylinder bobbin 835, a coil 834 wound around the bobbin 835, and the head support member 836.

The upper yoke 832, the lower yoke drum 852 and the rotor transformer 861 are made of a magnetic material, and disposed in such a manner that the magnetic flux exerted by the magnet 833 forms a closed loop. The magnet 833 is securely fixed to the inner face of the outer cylinder section 852b, and magnetized in parallel to the radial direction of the rotation of the magnetic head 840. The coil 834 and the bobbin 835 are inserted between the magnet 833 and the rotor transformer 861.

The head support member 836 may have the same structure as that of the head support member 736 described in the fifth embodiment.

The rotary-magnetic-head dynamic track following device 800 of the present embodiment has basically the same functions and effects as those of the rotary-magnetic-head dynamic track following device 700 of the fifth embodiment. In the rotary-magnetic-head dynamic track following device 800, however, the lower yoke drum 852 functions as both a so-called fixed drum and a yoke section, and the magnet 833 is also securely fixed to the lower yoke drum 852. With this arrangement, since it is not necessary to rotate the heavy magnet and yoke section, loads to be imposed on the motor section and the bearing section can be greatly reduced in comparison with the rotary-magnetic-head dynamic track following device 700. Further, the driving current to be supplied to the motor section can be minimized, thereby making it possible to reduce the power consumption.

As described above, the arrangements of the rotary-magnetic-head dynamic track following devices 700 and 800 achieve compactness and light weight of the rotary-magnetic-head dynamic track following devices by intensively installing the motor section, the bearing section, the head displacement adjusting mechanism and the rotary transformer section into an inner space formed within a frame that is constituted by the rotary drum and the fixed drum. Moreover, the head support members 736 and 836 are arranged so as to provide such improved functions as: an installing function of the magnetic head; an installing function of the bobbin around which the coil is wound so as to generate a controlling magnetic field; a stable elastic deformation function; and a better function for spiral grooves. Therefore, these arrangements allow the magnetic head to accurately follow recorded tracks while providing a stable travel of the magnetic tape. In particular, by providing the spiral grooves independent of the rotary drum, compactness and light weight of the rotary-magnetic-head dynamic track following device are greatly achieved.

Thus, the rotary-magnetic-head dynamic track following device of the present invention will provide great effects especially when it is installed in a magnetic recording-reproduction apparatus wherein high-density recording is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A rotary-magnetic-head dynamic track following device, which allows a magnetic head to follow a recorded track on a magnetic tape in accordance with a detection signal indicating a relative position between the magnetic head and the recorded track, comprising:

a fixed drum and a rotary drum for supporting the magnetic tape;

a rotary magnetic head that is located between the fixed drum and the rotary drum;

a fixed shaft having a longitudinal axis located in the center of the rotary-magnetic-head dynamic track following device, the center of the fixed shaft being aligned to the center of the fixed drum and the rotary drum;

rotative driving means having a rotation section for generating a rotative driving force, the rotative driving means located coaxial to the shaft and installed inside one of said drums;

rotation means that is connected to the rotation section of the rotative driving means, the rotation means rotating with the rotation section and centered on the fixed shaft;

magnetic-head displacement-adjusting means that is installed inside the other of said drums, the magnetic-head displacement-adjusting means centered on and rotatable about the shaft, wherein the magnetic-head displacement-adjusting means comprises:

magnetic field generating means for generating a first constant magnetic flux, the magnetic field generating means being disposed around the shaft;

a shiftable section for generating a second magnetic flux corresponding to the detection signal, the shiftable section, being coaxial with the longitudinal axis of and movable on the fixed shaft, by the interaction between the first magnetic flux and the second magnetic flux;

an elastic member to which the shiftable section is secured;

a head support section for connecting the rotary magnetic head to the shiftable section; and yoke means having a substantially closed ring-shaped empty chamber that houses the shiftable section, the yoke means being connected to the rotation means and being provided with at least (a) a fixed section fixed to the rotation means and (b) a connecting section for linking the fixed section, the elastic member, and the head support section, said magnetic field generating means being connected to a side wall of the yoke means inside the ring-shaped empty chamber of the yoke means so that the first magnetic flux forms a closed loop; and a rotary transformer which includes a fixed transformer core section that is connected and fixed to the shaft and a rotary transformer core section that is disposed face to face with the fixed transformer core section, the rotary transformer being arranged to extract a reproduced signal that the magnetic head has read from the magnetic tape and to transmit an information signal to be recorded on the magnetic tape to the magnetic head, the rotary transformer core section which constitutes one part of the yoke means.

2. The rotary-magnetic-head dynamic track following device as set forth in 1, wherein the yoke means includes a face perpendicular to a direction of movement of the shiftable section, the face being provided with a plurality of penetrations formed in a circular array centered on the shaft, the penetrations being used for detecting the amount of movement of the shiftable section.

3. The rotary-magnetic-head dynamic track following device as defined in claim 2, wherein at least either the fixed drum or the rotary drum is an upper drum, the fixed drum being aligned to face a plane perpendicular to the direction of movement of the shiftable section; and a position sensor for detecting the position of the shiftable section installed inside the fixed drum corresponding to positions of the penetrations.

4. The rotary-magnetic-head dynamic track following device as set forth in claim 1,
wherein the rotary drum has an outer face for sliding contact with the magnetic tape, a round face perpendicular to the shaft and a U-shaped groove formed in a ring shape around the shaft, the U-shaped groove having an opening in the round face,
wherein the magnetic field generating means, the magnetic-head displacement-adjusting means and the yoke means are integrally fixed inside the U-shaped groove.

5. The rotary-magnetic-head dynamic track following device as set forth in claim 4, wherein the yoke means and the rotary drum are provided with a shared window through which the magnetic head scans the magnetic tape.

6. The rotary-magnetic-head dynamic track following device as set forth in claim 1 wherein the yoke means also functions as a rotary transformer core of a rotary transformer for transmitting a signal to the magnetic head and the shiftable section.

7. The rotary-magnetic-head dynamic track following device as set forth in claim 1 wherein the connecting section includes a disc-shaped plate spring that is centered on the shaft.

8. The rotary-magnetic-head dynamic track following device as set forth in claim 7, wherein the head support section is installed at an outer circumferential edge of the plate spring.

9. The rotary-magnetic-head dynamic track following device as set forth in claim 7, wherein the disc shaped plate spring includes:
an inner ring section;
a head fixing section sticking out from the inner ring section in the radial direction;
an outer ring section formed as a partial circle with cut-out portions in the vicinity of the head fixing section; and
a plurality of bridge sections partially connecting the outer ring section and the inner ring section.

10. The rotary-magnetic-head dynamic track following device as defined in claim 1, wherein the shiftable section is disposed so that its center axis coincides with the shaft; the shiftable section includes a cylindrical insulator member provided with a coil for generating the second magnetic flux; and the elastic member includes two disc-shaped plate springs that are aligned face to face in a direction of movement of the shiftable section so as to sandwich and support the insulator member.

11. The rotary-magnetic-head dynamic track following device as set forth in claim 1 wherein the magnetic field generating means includes a permanent magnet that is magnetized in a radial direction of rotation of the magnetic head.

12. The rotary-magnetic-head dynamic track following device as defined in claim 1, further comprising:
a plurality of magnetic heads, wherein a pair of magnetic heads selected from the plurality of magnetic heads are arranged to make an angle that is smaller than the effective contact angle of the magnetic tape.

13. The rotary-magnetic-head dynamic track following device as set forth in claim 1 wherein,
the fixed drum has a slide face whereon the magnetic tape slides, and
the rotative driving means is installed inside the fixed drum.

14. The rotary-magnetic-head dynamic track following device as defined in claim 1, wherein the rotary transformer being housed in either the fixed drum or the rotary drum.

* * * * *